(12) United States Patent
Dejneka et al.

(10) Patent No.: US 12,338,169 B2
(45) Date of Patent: Jun. 24, 2025

(54) GLASS CERAMIC DEVICES AND METHODS WITH TUNABLE INFRARED TRANSMITTANCE

(71) Applicant: CORNING INCORPORATED, Corning, NY (US)

(72) Inventors: Matthew John Dejneka, Corning, NY (US); Jesse Kohl, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 846 days.

(21) Appl. No.: 17/292,613

(22) PCT Filed: Oct. 28, 2019

(86) PCT No.: PCT/US2019/058311
§ 371 (c)(1),
(2) Date: May 10, 2021

(87) PCT Pub. No.: WO2020/101874
PCT Pub. Date: May 22, 2020

(65) Prior Publication Data
US 2022/0009823 A1 Jan. 13, 2022

Related U.S. Application Data

(60) Provisional application No. 62/768,433, filed on Nov. 16, 2018.

(51) Int. Cl.
*C03C 3/091* (2006.01)
*C03C 3/11* (2006.01)
(Continued)

(52) U.S. Cl.
CPC ............... *C03C 4/10* (2013.01); *C03C 3/091* (2013.01); *C03C 3/11* (2013.01); *C03C 4/082* (2013.01);
(Continued)

(58) Field of Classification Search
CPC ........... C03C 3/091; C03C 3/11; C03C 4/082; C03C 4/085; C03C 4/10; C03C 10/0027;
(Continued)

(56) References Cited

U.S. PATENT DOCUMENTS 2,418,605 A 4/1947 Shepherd et al.
3,457,106 A 7/1969 Gillery
(Continued)

FOREIGN PATENT DOCUMENTS

CN 102566841 A 7/2012
CN 203825589 U 9/2014
(Continued)

OTHER PUBLICATIONS

International Search Report and Written Opinion of the International Searching Authority; PCT/US19/058311; Mailed Jun. 29, 2020; 14 Pages; European Property Office.
(Continued)

*Primary Examiner* — Bijan Ahvazi
(74) *Attorney, Agent, or Firm* — William M. Johnson; Payal A. Patel

(57) ABSTRACT

Devices, apparatuses, and methods are disclosed that include a glass or glass ceramic substrate with a bleached region and an unbleached region. Examples include a substrate with a region that transmits IR wavelength light, and a region that is substantially opaque to IR light. Examples include additional opacity in some or all regions to visible wavelength light and/or UV wavelength light.

17 Claims, 5 Drawing Sheets

(51) Int. Cl.
  *C03C 4/08* (2006.01)
  *C03C 4/10* (2006.01)
  *C03C 10/00* (2006.01)
  *G01J 5/08* (2022.01)
  *G01J 5/0803* (2022.01)
  *G02B 5/20* (2006.01)
  *G02B 5/22* (2006.01)
  *G01J 5/00* (2022.01)

(52) U.S. Cl.
  CPC ............ *C03C 4/085* (2013.01); *C03C 10/00* (2013.01); *C03C 10/0027* (2013.01); *C03C 10/0054* (2013.01); *G01J 5/0803* (2013.01); *G02B 5/208* (2013.01); *G02B 5/226* (2013.01); *C03C 2204/04* (2013.01); *G01J 2005/0077* (2013.01)

(58) Field of Classification Search
  CPC ............ C03C 10/0054; C03C 2202/04; C01J 5/0803; C01J 2005/0077
  See application file for complete search history.

(56) References Cited

U.S. PATENT DOCUMENTS

| | | |
|---|---|---|
| 4,455,338 A | 6/1984 | Henne |
| 4,899,507 A | 2/1990 | Mairlot |
| 4,985,099 A | 1/1991 | Mertens et al. |
| 6,086,983 A | 7/2000 | Yoshizawa |
| 6,332,690 B1 | 12/2001 | Murofushi |
| 6,582,799 B1 | 6/2003 | Brown et al. |
| 7,375,782 B2 | 5/2008 | Yamazaki et al. |
| 8,344,369 B2 | 1/2013 | Yamazaki et al. |
| 8,549,885 B2 | 10/2013 | Dannoux et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,593,042 B2 | 3/2017 | Hu et al. |
| 9,595,960 B2 | 3/2017 | Wilford |
| 9,802,485 B2 | 10/2017 | Masuda et al. |
| 9,846,473 B1 | 12/2017 | Kalscheur et al. |
| 9,895,975 B2 | 2/2018 | Lee et al. |
| 9,902,640 B2 | 2/2018 | Dannoux et al. |
| 9,931,817 B2 | 4/2018 | Rickerl |
| 10,131,118 B2 | 11/2018 | Kang et al. |
| 10,246,371 B1 | 4/2019 | Dejneka et al. |
| 10,829,408 B2 | 11/2020 | Dejneka et al. |
| 11,053,159 B2 | 7/2021 | Dejneka et al. |
| 2002/0039649 A1 | 4/2002 | Nagai |
| 2003/0210535 A1 | 11/2003 | Gaides |
| 2007/0223121 A1 | 9/2007 | Franck et al. |
| 2009/0179840 A1 | 7/2009 | Tanaka et al. |
| 2009/0185127 A1 | 7/2009 | Tanaka et al. |
| 2009/0314034 A1* | 12/2009 | Goulas ............... C03B 18/02 65/85 |
| 2010/0031590 A1 | 2/2010 | Buchwald et al. |
| 2011/0151153 A1 | 6/2011 | Felder et al. |
| 2012/0202030 A1 | 8/2012 | Kondo et al. |
| 2013/0088441 A1 | 4/2013 | Chung et al. |
| 2014/0256865 A1 | 9/2014 | Boulton et al. |
| 2014/0305929 A1 | 10/2014 | Weiss et al. |
| 2015/0239772 A1* | 8/2015 | Baker ................. C03C 4/02 428/410 |
| 2015/0246507 A1 | 9/2015 | Brown et al. |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0184764 A1 | 6/2017 | Matsuyuki et al. |
| 2017/0327402 A1 | 11/2017 | Fujii et al. |
| 2017/0349473 A1 | 12/2017 | Moriya et al. |
| 2017/0362119 A1* | 12/2017 | Dejneka ................. C03C 3/095 |
| 2018/0050948 A1 | 2/2018 | Faik et al. |
| 2018/0111569 A1 | 4/2018 | Faik et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0188869 A1 | 7/2018 | Boggs et al. |
| 2018/0210118 A1 | 7/2018 | Gollier et al. |
| 2018/0245125 A1 | 8/2018 | Tsai et al. |
| 2018/0273419 A1 | 9/2018 | Annamalai et al. |
| 2019/0177212 A1 | 6/2019 | Dejneka et al. |
| 2020/0399167 A1 | 12/2020 | Dejneka et al. |
| 2021/0070018 A1 | 3/2021 | Dejneka et al. |

FOREIGN PATENT DOCUMENTS

| | | |
|---|---|---|
| CN | 104108881 A | 10/2014 |
| CN | 104679341 A | 6/2015 |
| CN | 204463066 U | 7/2015 |
| CN | 104843976 A | 8/2015 |
| CN | 105511127 A | 4/2016 |
| DE | 4415878 A1 | 11/1995 |
| DE | 102004022008 A1 | 12/2004 |
| DE | 102013214108 A1 | 2/2015 |
| EP | 2764320 A2 | 8/2014 |
| FR | 2918411 A1 | 1/2009 |
| GB | 2011316 A | 7/1979 |
| JP | 11-060293 A | 3/1999 |
| JP | 3059337 B2 | 7/2000 |
| JP | 2003-500260 A | 1/2003 |
| JP | 2004-333102 A | 11/2004 |
| JP | 2013-084269 A | 5/2013 |
| JP | 2015-092422 A | 5/2015 |
| JP | 5748082 B2 | 7/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2016-207200 A | 12/2016 |
| KR | 10-2016-0144008 A | 12/2016 |
| TW | 201134661 A | 10/2011 |
| TW | 201538446 A | 10/2015 |
| TW | 201819328 A | 6/2018 |
| WO | 98/01649 A1 | 1/1998 |
| WO | 2000/073062 A1 | 12/2000 |
| WO | 2007/108861 A1 | 9/2007 |
| WO | 2012/058084 A2 | 5/2012 |
| WO | 2013/050727 A2 | 4/2013 |
| WO | 2014/175371 A1 | 10/2014 |
| WO | 2015/031594 A2 | 3/2015 |
| WO | 2016/044360 A1 | 3/2016 |
| WO | 2016/125713 A1 | 8/2016 |
| WO | 2016/136758 A1 | 9/2016 |
| WO | 2016/196531 A1 | 12/2016 |
| WO | 2016/196546 A1 | 12/2016 |
| WO | 2017/155932 A1 | 9/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |
| WO | 2018/129065 A2 | 7/2018 |
| WO | 2019/051408 A2 | 3/2019 |
| WO | 2020/106486 A1 | 5/2020 |
| WO | 2020/167400 A1 | 8/2020 |
| WO | 2020/167416 A1 | 8/2020 |
| WO | 2020/171967 A1 | 8/2020 |
| WO | 2020/180516 A1 | 9/2020 |

OTHER PUBLICATIONS

"Diffuse uniform LED back lighting for capacitive touch keypads", In Rapid Keypads, Available at: https://rapidkeypads.com/diffuse-uniform-led-back-lighting.php, 9 pages.
"IR Transmitting Acrylic Sheets", Available at: https://www.eplastics.com/sheets/acrylic-plexiglass/ir-transmitting, 6 pages.
"IR Transmitting Plexiglass Sheets", Available at: https://www.eplastics.com/plexiglass/acrylic-sheets/ir-transmitting, 8 pages.
"Near Infrared Imaging Market—Global Forecast to 2020" in SB Wire, 2016, 3 pages.

(56) References Cited

OTHER PUBLICATIONS

"Near Infrared Imaging Market to Grow 8.8% to Reach $471.2 Million by 2020", in PR Newswire, 2016, 4 pages.

Adachi et al, "Chromatic Instabilities in Cesium-Doped Tungsten Bronze Nanoparticles", J. Appl. Phys., 115194304 (2013).

C.-J. Chen, D.-H. Chen, "Preparation and near-infrared photothermal conversion property of cesium tungsten oxide nanoparticles", Nanoscale Res. Lett., 8, 57 (2013).

F. Shi, J. Liu, X. Dong, Q. Xu, J. Luo, H. Ma, "Hydrothermal Synthesis of $Cs_xWO_3$ and the Effects of $N_2$ annealing on its Microstructure and Heat Shielding Properties", J. Mater. Sci. Technol., 30 [4], 342 (2014).

Frank, "Near-Infrared Image Sensor Targets IoT Camera Market", in Electronics 360, 2016, 2 pages.

Green et al., "Optical properties of dilute hydrogen tungsten bronze thin films," J. Appl. Phys. 74, 3451 (1993).

Hussain, "Optical and Electrochromic Properties of Annealed Lithium-Molybdenum-Bronze Thin Films", J. Electronics Materials, vol. 31 [6], 2002.

International Search Report and Written Opinion of the International Searching Authority; PCT/US2018/012215 Dated Aug. 1, 2018; 21 Pgs; European Patent Office.

International Search Report and Written Opinion of the International Searching Authority; PCT/US2018/041062 Dated Nov. 13, 2018; 15 Pgs; European Patent Office.

Invitation To Pay Additional Fees of the International Searching Authority; PCT/US2018/012215; Mailed May 11, 2018; 13 Pages; European Patent Office.

J. Y. Kim, H. J. Yoon, E. K. Kim, S. Y. Jeong, G. J. Shin, S. Lee, and K. H. Choi, "Near Infrared Cut-off Characteristics of various Perovskite-based Composite Films", IPCBEE, 43, 9 (2012).

K. Moon, J. J. Cho, Y.-B. Lee, P. J. Yoo, C. W. Bark, and J. Park, "Near Infrared Shielding Properties of Quarternary Tungsten bronze Nanoparticles $Na_{0.11}Cs_{0.22}WO_3$", Bull. Korean Chem. Soc. 34 [3], 731 (2013).

K.A. Kaliyev, "What are Tungsten Bronzes", EIR vol. 20, No. 17, Apr. 30, 1993, 2 pages.

M. Green and Z. Hussain, "Optical properties of lithium tungsten bronze thin films", J. Appl. Phys. 81, 3592 (1997).

M. Rouhani, "Photochromism of Molybdenum Oxide," National University of Singapore, PHD thesis, NUS Graduate school for Integrative Sciences and Engineering, 2013.

P. G. Dickens and M. S. Whittingham, "The Tungsten Bronzes and Related Compounds", J. Amer. Chem. Soc., 81, 5556 (1981).

Sayed et al., "Some properties of sodium tungsten bronzes as a function of sodium concentration", Indian Journal of Chem. Tech., vol. 12, 2005, 5 pages.

Zeng et al., "The preparation of a high performance near-infrared shielding $Cs_xWO_3/SiO_2$ composite resin coating and research on its optical stability under ultraviolet illumination", J. Mater. Chem. C, 3, 8050 (2015).

Taiwanese Patent Application No. 108141530, Office Action dated Jul. 10, 2023, 2 pages (English Translation Only); Taiwanese Patent Office.

Chinese Patent Application No. 201980078421.7, Office Action, dated Sep. 1, 2022, 19 pages (10 pages of English Translation and 9 pages of Original Copy); Chinese Patent Office.

\* cited by examiner

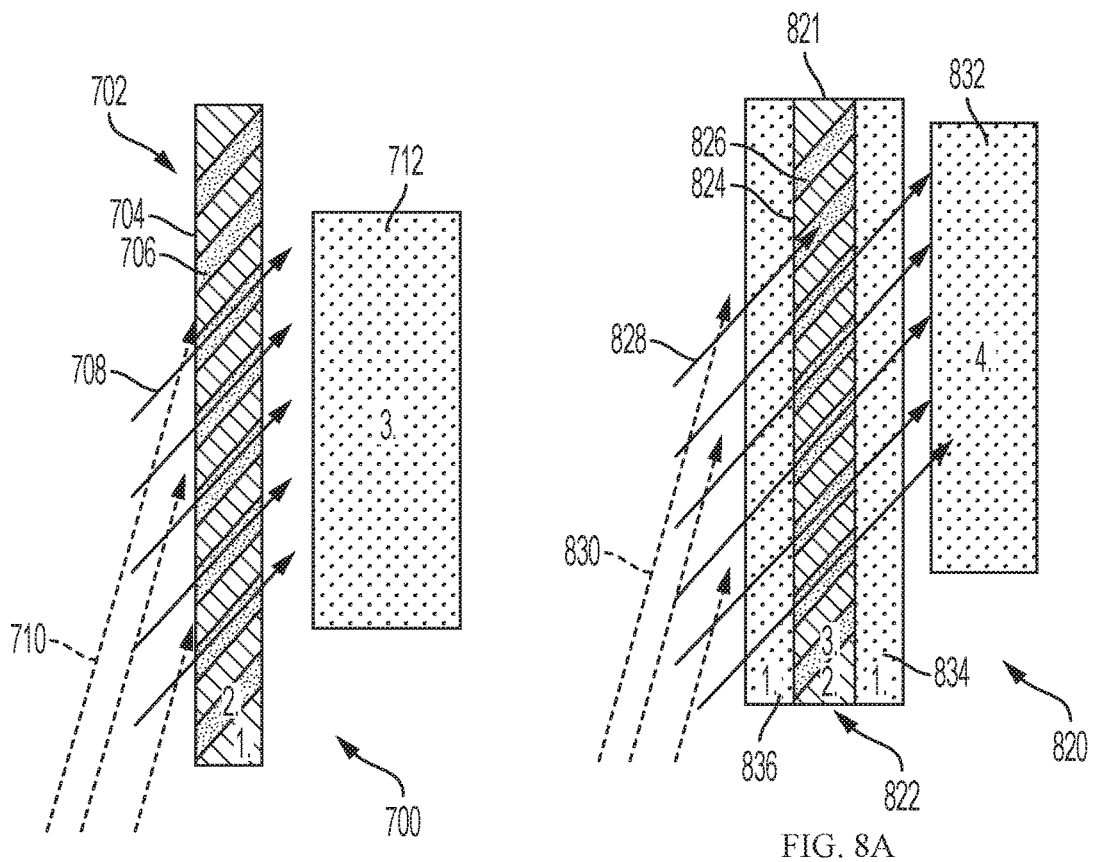
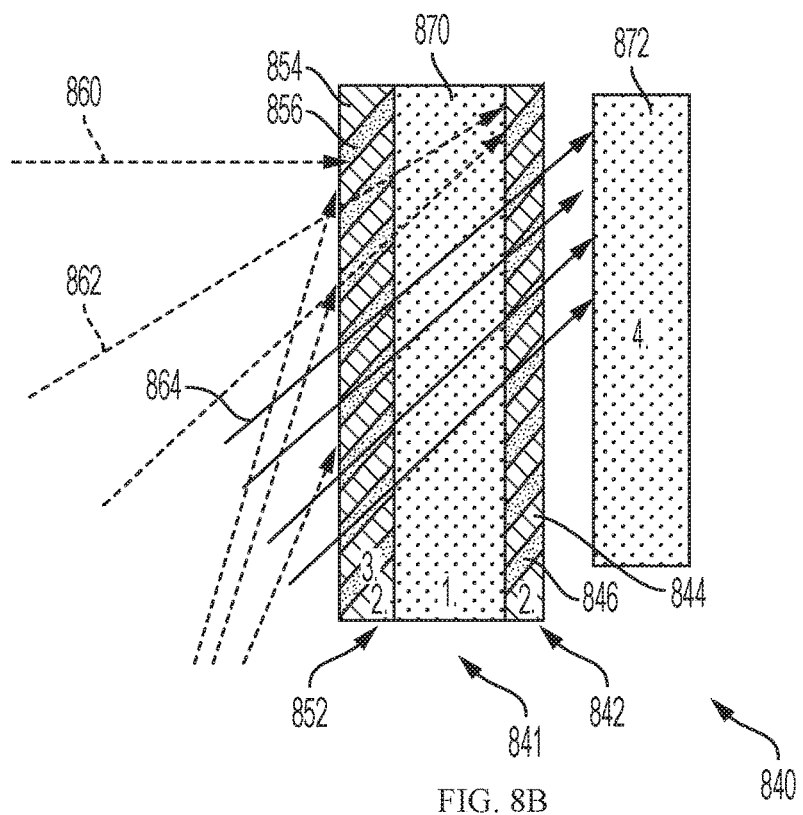
FIG. 7
FIG. 8A
FIG. 8B

GLASS CERAMIC DEVICES AND METHODS WITH TUNABLE INFRARED TRANSMITTANCE

CROSS-REFERENCE TO RELATED APPLICATIONS

This application is a national stage application under 35 U.S.C. § 371 of International Application No. PCT/US2019/058311, filed on Oct. 28, 2019, which claims the benefit of priority under 35 U.S.C. § 119 of U.S. Provisional Application Ser. No. 62/768,433 filed on Nov. 16, 2018 the content of which is relied upon and incorporated herein by reference in its entirety.

TECHNICAL FIELD

The present disclosure generally relates to articles including glasses and/or glass-ceramics, and more specifically, to compositions and methods of forming such articles.

BACKGROUND

Regions of a panel that include a "window" that is transparent in a certain wavelength range, that otherwise blends in to the larger panel may be referred to as "deadfronts." In one example, a deadfront may include a concealed detector or a camera. One commercially valuable wavelength range include the near infrared (NIR).

Commercially available injection-moldable black NIR-transparent plastics can be utilized to make discreet 'dead-fronted' housings for NIR cameras/sensors/etc. These plastics may be UV and visible light blocking but IR and microwave transparent. However, such materials have several disadvantages. First, is poor mechanical performance relative to glass or glass ceramics. Second is cost, which can be significant. Third, is NIR light leakage because the housing would be entirely transparent in the NIR, which could impair a sensor/detector's performance and also expose the device to un-wanted intrusion from other devices operating at these wavelengths. NIR-blocking coatings may be used, but are generally comprised of metallic thin films that attenuate microwave frequencies, which are often used to wirelessly communicate with devices such as cameras behind the deadfronts.

Thus, there is a need for the development of new devices, for example deadfront and/or hidden devices. There also is a need for a material through which NIR wavelengths can be transmitted that provide effective dead front concealment. These technical challenges, and others, are addressed by examples described in the following disclosure.

BRIEF DESCRIPTION OF THE DRAWINGS

FIG. 7 shows a device or apparatus in accordance with some example embodiments.

FIG. 8A shows another device or apparatus in accordance with some example embodiments.

FIG. 8B shows another device or apparatus in accordance with some example embodiments.

DESCRIPTION OF EMBODIMENTS

Figure 1A:
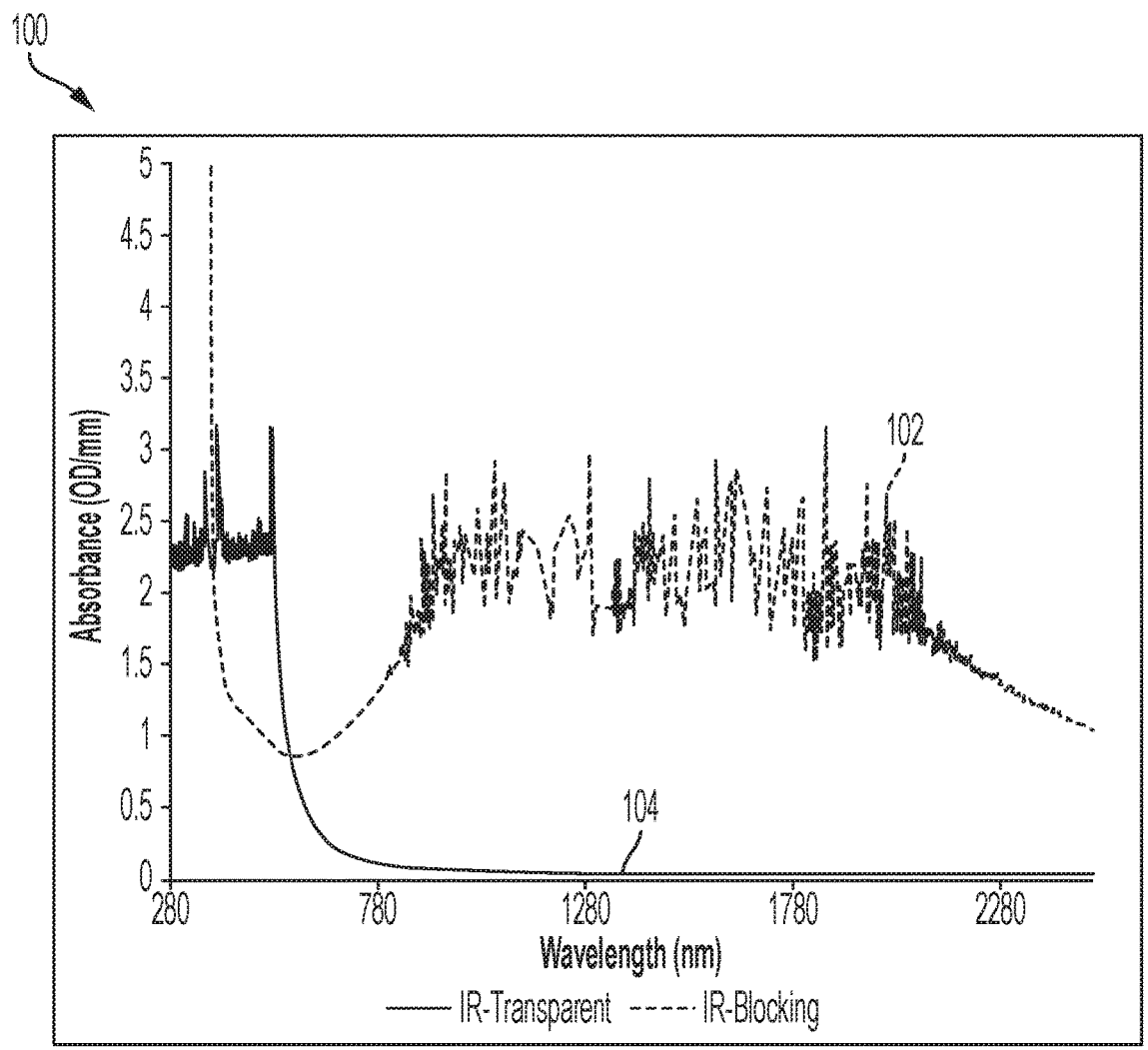
FIG. 1A shows absorbance spectra of a silver doped material in accordance with some example embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of fusion that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

Coefficients of thermal expansion (CTE) are expressed in terms of $10^{-7}/°$ C. and represent a value measured over a temperature range from about 0° C. to about 300° C. unless otherwise specified. The terms "relatively low CTE" and "low CTE" are used interchangeably in the disclosure with regard to clad glass layers with a starting glass composition (e.g., prior to drawing, laminating, and/or ion exchange) having a CTE that is lower than the CTE of the starting composition of the core glass by at least about $5\times10^{-7}/°$ C. The CTE of clad glass layers may also be lower than the CTE of the core glass layer by an amount in the range from about $5\times10^{-7}/°$ C. to about $70\times10^{-7}/°$ C., from about $10\times10^{-7}/°$ C. to about $60\times10^{-7}/°$ C., or from about $10\times10^{-7}/°$ C. to about $50\times10^{-7}/°$ C. For example, the core glass may have a CTE of about $100\times10^{-7}/°$ C. and the clad glass layers may have a CTE of about $50\times10^{-7}/°$ C., such that there is a difference of about $50\times10^{-7}/°$ C. between the CTE of the core glass and the clad glass layers.

The terms "thin glass" or "relatively thin glass" are used interchangeably in relation to laminated glass structures in the disclosure and intended to mean a laminated structure having a total thickness not exceeding about 3 mm.

The terms "mechanically strengthened glass laminate," "mechanically strengthened glass laminated structure" and "mechanical strengthening" are used in relation to the laminated glass structures of the disclosure to mean a glass laminate that has been formed by laminating a high CTE core glass to low CTE clad glass layer(s), thereby creating compressive stresses in the clad glass layers when the laminate is cooled following lamination. These compressive stresses can offset externally applied mechanical stresses, which have the net effect of strengthening the laminate.

The terms "chemically strengthened" and "chemical strengthening," as used in the present description, are intended to mean glass (e.g., a core glass layer, a clad glass layer, etc.) that has been strengthened using an ion exchange process, as understood by those with ordinary skill in the field of the disclosure, to create compressive stresses in the surface region of the glass at one or more of its primary surfaces and edges.

Selected examples of materials, devices, and apparatuses of the disclosure allow for strengthening through clad/core layer CTE mismatch at levels that do not require additional ion exchange processing, which results in a relatively low cost, low weight laminate glass-ceramic article with high durability.

As used herein, "transmission" and "transmittance" refer to external transmission or transmittance, which takes absorption, scattering and reflection into consideration. Fresnel reflection is not factored out of the transmission and transmittance values reported herein.

As used herein, the term "opaque" is defined as an average absorbance of 1.0 OD/mm or greater, 1.3 OD/mm or greater, or 1.5 OD/mm or greater, or 2 OD/mm or greater. In one example, materials described as "opaque" possess this property due to absorption of light, and not by scattering of light due to coarse particles.

As used herein, the term "haze" refers to the percentage of transmitted light scattered outside an angular cone of ±2.5° in a sample having a transmission path of about 1 mm and measured in accordance with ASTM procedure D1003. According to various examples, an article may exhibit a low haze. For example, the article may exhibit a haze of about 20% or less, or about 15% or less, or about 12% or less, or about 11% or less, or about 10.5% or less, or about 10% or less, or about 9.5% or less, or about 9% or less, or about 8.5% or less, or about 8% or less, or about 7.5% or less, or about 7% or less, or about 6.5% or less, or about 6% or less, or about 5.5% or less, or about 5% or less, or about 4.5% or less, or about 4% or less, or about 3.5% or less, or about 3% or less, or about 2.5% or less, or about 2% or less, or about 1.5% or less, or about 1% or less, or about 0.5% or less, or about 0.4% or less, or about 0.3% or less, or about 0.2% or less, or about 0.1% or less or any and all values and ranges therebetween. The haze of the article is measured on a 1 mm thick sample and in accordance with the procedure outlined above in connection with haze measurement.

As used herein, "optical density units", "OD" and "OD units" are used interchangeably in the disclosure to refer to optical density units, as commonly understood as a measure of absorbance of the material tested, as measured with a spectrometer given by OD=−log (I/I0) where I0 is the intensity of light incident on the sample and I is the intensity of light that is transmitted through the sample. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

As also used herein, the term "[constituent]-free [glass or glass-ceramic]" (e.g., "cadmium and selenium-free glass-ceramic"), is indicative of a glass or a glass-ceramic that is completely free, or substantially free (i.e., <500 ppm), of the listed constituent(s) and is prepared such that the listed constituent(s) are not actively, intentionally or purposefully added or batched into the glass or glass-ceramic.

Articles of the present disclosure are composed of glass and/or glass-ceramics having one or more of the compositions outlined herein. The article can be employed in any number of applications. For example, the article can be employed in the form of substrates, elements, lenses, covers and/or other elements in any number of optics related and/or aesthetic applications.

The article is formed from an as-batched composition and is cast in a glass state. The article may later be annealed and/or thermally processed (e.g., heat treated) to form a glass-ceramic state having a plurality of ceramic or crystalline particles. It will be understood that depending on the casting technique employed, the article may readily crystallize and become a glass-ceramic without additional heat treatment (e.g., essentially be cast into the glass-ceramic state). In examples where a post-forming thermal processing is employed, a portion, a majority, substantially all or all of the article may be converted from the glass state to the glass-ceramic state. As such, although compositions of the article may be described in connection with the glass state and/or the glass-ceramic state, the bulk composition of the article may remain substantially unaltered when converted between the glass and glass-ceramic states, despite localized portions of the article have a different compositions (i.e., owing to the formation of the ceramic or crystalline precipitates).

According to various examples, the article may include $Al_2O_3$, $SiO_2$, $B_2O_3$, $WO_3$, $MO_3$, $R_2O$ where $R_2O$ is one or more of $Li_2O$, $Na_2O$, $K_2O$, $Rb_2O$ and $Cs_2O$, RO where RO is one or more of MgO, CaO, SrO, BaO and ZnO and a number of dopants. It will be understood that a number of other constituents (e.g., F, As, Sb, Ti, P, Ce, Eu, La, Cl, Br, etc.) without departing from the teachings provided herein.

The article may have from about 1 mol % to about 99 mol % $SiO_2$, or from about 1 mol % to about 95 mol % $SiO_2$, or from about 45 mol % to about 80 mol % $SiO_2$, or from about 60 mol % to about 99 mol % $SiO_2$, or from about 61 mol % to about 99 mol % $SiO_2$, or from about 30 mol % to about 99 mol % $SiO_2$, or from about 58 mol % to about 78 mol % $SiO_2$, or from about 55 mol % to about 75 mol % $SiO_2$, or from about 50 mol % to about 75 mol % $SiO_2$, or from about 54 mol % to about 68 mol % $SiO_2$, or from about 60 mol % to about 78 mol % $SiO_2$, or from about 65 mol % to about 67 mol % $SiO_2$, or from about 60 mol % to about 68 mol % $SiO_2$, or from about 56 mol % to about 72 mol % $SiO_2$, or from about 60 mol % to about 70 mol % $SiO_2$. It will be understood that any and all values and ranges between the above noted ranges of $SiO_2$ are contemplated. $SiO_2$ may serve as the primary glass-forming oxide and affect the stability, resistance to devitrification and/or viscosity of the article.

The article may include from about 0 mol % to about 50 mol % $Al_2O_3$, or from about 0.5 ml % to about 20 mol % $Al_2O_3$, or from about 0.5 mol % to about 15 mol % $Al_2O_3$, or from about 7 mol % to about 15 mol % $Al_2O_3$, or from about 0.6 mol % to about 17 mol % $Al_2O_3$, or from about 0.6 mol % to about 14 mol % $Al_2O_3$, or from about 7 mol % to about 14 mol % $Al_2O_3$, or from about 9.5 mol % to about 10 mol % $Al_2O_3$, or from about 9 mol % to about 14 mol % $Al_2O_3$, about 9.5 mol % to about 11.5 mol % $Al_2O_3$, or from about 0.3 mol % to about 10 mol % $Al_2O_3$, or from about 0.3 mol % to about 15 mol % $Al_2O_3$, or from about 2 mol % to about 16 mol % $Al_2O_3$, or from about 5 mol % to about 12 mol % $Al_2O_3$, or from about 8 mol % to about 12 mol % $Al_2O_3$, or from about 5 mol % to about 10 mol % $Al_2O_3$. It will be understood that any and all values and ranges between the above noted ranges of $Al_2O_3$ are contemplated. $Al_2O_3$ may function as a conditional network former and contributes to a stable article with low CTE, article rigidity, and to facilitate melting and/or forming.

The article may include $WO_3$ and/or $MoO_3$. For example, $WO_3$ plus $MoO_3$ may be from about 0.35 mol % to about 30 mol %. $MoO_3$ may be about 0 mol % and $WO_3$ is from about 1.0 mol % to about 20 mol %, or $MoO_3$ may be about 0 mol % and $WO_3$ is from about 1.0 mol % to about 14 mol %, or $MoO_3$ is from about 0 mol % to about 8.2 mol % and $WO_3$ is from about 0 mol % to about 16 mol %, or $MoO_3$ is from about 0 mol % to about 8.2 mol % and $WO_3$ is from about 0 mol % to about 9 mol %, or $MoO_3$ is from about 1.9 mol % to about 12.1 mol % and $WO_3$ is from about 1.7 mol % to about 12 mol %, or $MoO_3$ is from about 0 mol % to about 8.2 mol % and $WO_3$ is from about 0 mol % to about 7.1 mol %, or $MoO_3$ is from about 1.9 mol % to about 12.1 mol % and $WO_3$ is from about 1.7 mol % to about 4.5 mol %, or $MoO_3$ is about 0 mol % and $WO_3$ is from about 1.0 mol % to about 7.0 mol %. With respect to $MoO_3$, the glass composition may have from about 0.35 mol % to about 30 mol % $MoO_3$, or from about 1 mol % to about 30 mol % $MoO_3$, or from about 0.9 mol % to about 30% $MoO_3$, or from about 0.9 mol % to about 20% $MoO_3$, or from about 0 mol % to about 1.0 mol % $MoO_3$, or from about 0 mol % to about 0.2 mol % $MoO_3$. With respect to $WO_3$, the glass composition may have from about 0.35 mol % to about 30 mol % $WO_3$, or from about 1 mol % to about 30 mol % $WO_3$, or from about 1 mol % to about 17 mol % $WO_3$, or from about 1.9 mol % to about 10 mol % $WO_3$, or from about 0.35 mol % to about 1 mol % $WO_3$, or from about 1.9 mol % to about 3.9 mol % $WO_3$, or from about 2 mol % to about 15 mol % $WO_3$, or from about 4 mol % to about 10 mol % of $WO_3$, or from about 5 mol % to about 7 mol % $WO_3$. It will be understood that any and all values and ranges between the above noted ranges of $WO_3$ and/or $MoO_3$ are contemplated.

The article may include from about 2 mol % to about 40 mol % of $B_2O_3$, or from about 4 mol % to about 40 mol % of $B_2O_3$, or from about 4.0 mol % to about 35 mol % $B_2O_3$, or from about 4.0 mol % to about 27 mol % $B_2O_3$, or from about 5.0 mol % to about 25 mol % $B_2O_3$, or from about 9.4 mol % to about 10.6 mol % $B_2O_3$, or from about 5 mol % to about 20 mol % $B_2O_3$, or from about 4.6 mol % to about 20 mol % $B_2O_3$, or from about 9.3 mol % to about 15.5 mol % $B_2O_3$, or from about 10 mol % to about 20 mol % $B_2O_3$, or from about 10 mol % to about 25 mol % $B_2O_3$. It will be understood that any and all values and ranges between the above noted ranges of $B_2O_3$ are contemplated. $B_2O_3$ may be a glass-forming oxide that is used to reduce CTE, density, and viscosity making the article easier to melt and form at low temperatures.

The article may include at least one alkali metal oxide. The alkali metal oxide may be represented by the chemical formula $R_2O$ where $R_2O$ is one or more of $Li_2O$, $Na_2O$, $K_2O$, $Rb_2O$, $Cs_2O$ and/or combinations thereof. The article may have an alkali metal oxide composition of from about 0.1 mol % to about 50 mol % $R_2O$, or from about 0 mol % to about 14 mol % $R_2O$, or from about 3 mol % to about 14 mol % $R_2O$, or from about 5 mol % to about 14 mol % $R_2O$, or from about 6.4 mol % to about 9.6 mol % $R_2O$, or from about 2.9 mol % to about 12.2 mol % $R_2O$, or from about 9.7 mol % to about 12.8 mol % $R_2O$, or from about 0.6 mol % to about 10 mol % $R_2O$, or from about 0 mol % to about 15 mol % $R_2O$, or from about 3 mol % to about 12 mol % $R_2O$, or from about 7 mol % to about 10 mol % $R_2O$. It will be understood that any and all values and ranges between the above noted ranges of $R_2O$ are contemplated. Alkali oxides (e.g., $Li_2O$, $Na_2O$, $K_2O$, $Rb_2O$, and $Cs_2O$) may be incorporated into the article for multiple reasons including: (i) reducing the melting temperature, (ii) increasing formability, (iii) enabling chemical strengthening by ion exchange and/or (iv) as a specie to partition into certain crystallites.

According to various examples, $R_2O$ minus $Al_2O_3$ ranges from about from about −35 mol % to about 7 mol %, or from about −12 mol % to about 2.5 mol %, or from about −6% to about 0.25%, or from about −3.0 mol % to about 0 mol %. It will be understood that any and all values and ranges between the above noted ranges of $R_2O$ minus $Al_2O_3$ are contemplated.

The article may include at least one alkaline earth metal oxide. The alkaline earth metal oxide may be represented by the chemical formula RO where RO is one or more of MgO, CaO, SrO, BaO and ZnO. The article may include RO from about 0.02 mol % to about 50 mol % RO, or from about 0.01 mol % to about 5 mol % RO, or from about 0.02 mol % to about 5 mol % RO, or from about 0.05 mol % to about 10 mol % RO, or from about 0.10 mol % to about 5 mol % RO, or from about 0.15 mol % to about 5 mol % RO, or from about 0.05 mol % to about 1 mol % RO, or from about 0.5 mol % to about 4.5 mol % RO, or from about 0 mol % to about 1 mol % RO, or from about 0.96 mol % to about 3.9 mol % RO, or from about 0.2 mol % to about 2 mol % RO, or from about 0.01 mol % to about 0.5 mol % RO, or from about 0.02 mol % to about 0.22 mol % RO. It will be understood that any and all values and ranges between the above noted ranges of RO are contemplated. According to various examples, $R_2O$ may be greater than RO. Further, the article may be free of RO. Alkaline earth oxides (e.g., MgO, CaO, SrO, and BaO) and other divalent oxides such as ZnO may improve the melting behavior of the article and can also act to increase CTE, Young's modulus, and shear modulus of the article.

The article may include from about 0.01 mol % to about 5 mol % of $SnO_2$, or from about 0.01 mol % to about 0.5 mol % of $SnO_2$, or from about 0.05 mol % to about 0.5 mol % $SnO_2$, or from about 0.05 mol % to about 2 mol % $SnO_2$, or from about 0.04 mol % to about 0.4 mol % $SnO_2$, or from about 0.01 mol % to about 0.4 mol % $SnO_2$, or from about 0.04 mol % to about 0.16 mol % $SnO_2$, or from about 0.01 mol % to about 0.21 mol % $SnO_2$, or from about 0 mol % to about 0.2 mol % $SnO_2$, or from about 0 mol % to about 0.1 mol % $SnO_2$. It will be understood that any and all values and ranges between the above noted ranges of $SnO_2$ are contemplated. The article may also include $SnO_2$ as a fining agent (e.g., other fining agents may include $CeO_2$, $As_2O_3$, $Sb_2O_3$, Cl—, F— or the like) in small concentrations to aid in the elimination of gaseous inclusions during melting. Certain fining agents may also act as redox couples, color centers, and or species that nucleate and or intercalate into crystallites formed in the article.

The composition of certain constituents of the article may depend on the presence and/or composition of other constituents. For example, if $WO_3$ is from about 1 mol % to about 30 mol %, the article further includes $Fe_2O_3$ of about 0.9 mol % or less or $SiO_2$ is from about 60 mol % to about 99 mol %. In another example, if $WO_3$ is from about 0.35 mol % to about 1 mol %, the article includes $SnO_2$ from about 0.01 mol % to about 5.0 mol %. In another example, if $MoO_3$ is from about 1 mol % to about 30 mol %, $SiO_2$ is from about 61 mol % to about 99 mol % or $Fe_2O_3$ is about 0.4 mol % or less and $R_2O$ is greater than RO. In another example, if $MoO_3$ is from about 0.9 mol % to about 30% and $SiO_2$ is from about 30 mol % to about 99 mol %, the article includes $SnO_2$ from about 0.01 mol % to about 5 mol %.

The article may be substantially cadmium and substantially selenium free. According to various examples, the article can further include at least one dopant selected from the group consisting of Ti, V, Cr, Mn, Fe, Ni, Cu, Pb, Pd, Au, Cd, Se, Ta, Bi, Ag, Ce, Pr, Nd, and Er to alter the ultraviolet, visual, color and/or near-infrared absorbance. The dopants may have concentration of from about 0.0001 mol % to about 1.0 mol % within the article. For example, the article may include at least one of Ag from about 0.01 mol % to about 0.48 mol %, Au from about 0.01 mol % to about 0.13 mol %, $V_2O_5$ from about 0.01 mol % to about 0.03 mol %, $Fe_2O_3$ from about 0 mol % to about 0.2 mol %, $Fe_2O_3$ from about 0 mol % to about 0.2 mol %, and CuO from about 0.01 mol % to about 0.48 mol %. According to another example, the article may include at least one of Ag from about 0.01 mol % to about 0.75 mol %, Au from about 0.01 mol % to about 0.5 mol %, $V_2O_5$ from about 0.01 mol % to about 0.03 mol %, and CuO from about 0.01 mol % to about 0.75 mol %. The article may include fluorine in the range of about 0 mol % to about 5 mol % to soften the glass. The article may include phosphorus from about 0 mol % to about 5 mol % to further modify physical properties of the article and modulate crystal growth. The article may include $Ga_2O_3$, $In_2O_3$ and/or $GeO_2$ to further modify physical and optical (e.g., refractive index) properties of the article. The following trace impurities may be present in the range of about 0.001 mol % to about 0.5 mol % to further modify the ultraviolet, visible (e.g., 390 nm to about 700 nm), and near-infrared (e,g., about 700 nm to about 2500 nm) absorbance and/or make the article fluoresce: Ti, V, Cr, Mn, Fe, Co, Ni, Cu, Se, Nb, Mo, Tc, Ru, Rh, Pd, Ag, Cd, Te, Ta, Re, Os, Ir, Pt, Au, Ti, Pb, Bi, Ce, Pr, Nd, Sm, Eu, Gd, Tb, Dy, Ho, Er, Tm, Yb, and Lu. Further, small additions of $P_2O_5$ may be made to certain compositions to further modify the physical properties and viscosity of the article.

It will be understood that each of the above noted compositions and composition ranges for $SiO_2$, $Al_2O_3$, $WO_3$, $MoO_3$, $WO_3$ plus $MoO_3$, $B_2O_3$, $R_2O$, RO, $V_2O_5$, Ag, Au, CuO, $SnO_2$, and dopants may be used with any other composition and/or composition range of the other constituents of the article as outlined herein.

Conventional formation of tungsten, molybdenum, or mixed tungsten-molybdenum containing alkali glasses has been hampered by the separation of the melt constituents during the melting process. The separation of the glass constituents during the melting process resulted in a perceived solubility limit of alkali tungstate within the molten glass, and therefore of articles cast from such melts. Conventionally, when a tungsten, molybdenum, or mixed tungsten-molybdenum melt was even slightly peralkaline (e.g., $R_2O$—$Al_2O_3$=about 0.25 mol % or greater), the melted borosilicate glass formed both a glass and a dense liquid second phase. While the concentration of the alkali tungstate second phase could be reduced by thorough mixing, melting at a high temperature, and employing a small batch size (~1000 g), it could not be fully eliminated leading to a deleterious second crystalline phase forming. It is believed that the formation of this alkali tungstate phase occurs in the initial stages of the melt, where tungsten and/or molybdenum oxide reacts with "free" or "unbound" alkali carbonates. Due to the high density of alkali tungstate and/or alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable.

It has been discovered by the inventors of the present disclosure that a homogenous single-phase W or Mo-containing peralkaline melt may be obtained through the use of "bound" alkalis. For purposes of this disclosure, "bound" alkalis are alkali elements which are bonded to alumina, boria and/or silica while "free" or "unbound" alkalis are alkali carbonates, alkali nitrates and/or alkali sulfates in which the alkali are not bound to silica, boria or alumina. Exemplary bound alkalis may include feldspar, nepheline, borax, spodumene, other sodium or potassium feldspars, alkali-alumino-silicates, alkali silicates and/or other naturally occurring and artificially created minerals containing an alkali and one or more aluminum, boron and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of any alkali tungstate and/or alkali molybdate second phase. This has also allowed melt temperature and mixing method to be varied and still produce a single-phase homogenous glass. It will be understood that as the alkali tungstate phase and the borosilicate glass are not completely immiscible, prolonged stirring may also allow mixing of the two phases to cast a single phase article.

Once the glass melt is cast and solidified into the glass state article, the article may be annealed, heat treated or otherwise thermally processed to form the crystalline phase within the article. Accordingly, the article may be transformed from the glass state to the glass-ceramic state. The crystalline phase of the glass-ceramic state may take a variety of morphologies. According to various examples, the crystalline phase is formed as a plurality of precipitates within the heat treated region of the article. As such, the precipitates may have a generally crystalline structure.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from about 1 nm to about 500 nm, or from about 1 nm to about 400 nm, or from about 1 nm to about 300 nm, or from about 1 nm to about 250 nm, or from about 1 nm to about 200 nm, or from about 1 nm to about 100 nm, or from about 1 nm to about 75 nm, or from about 1 nm to about 50 nm, or from about 1 nm to about 25 nm or from about 1 nm to about 20 nm or from about 1 nm to about 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from about 2 nm to about 30 nm, or from about 2 nm to about 10 nm or from about 2 nm to about 7 nm. It will be understood that the size and/or morphology of the precipitates may be uniform, substantially uniform or may vary. Generally, peraluminous compositions of the article may produce precipitates having a needle-like shape with a length of from about 100 nm to about 250 nm and a width of from about 5 nm to about 30 nm. Peralkaline compositions of the article may produce needle-like precipitates having a length of from about 10 nm to about 30 nm and a width of from about 2 nm to about 7 nm. Ag, Au and/or Cu containing examples of the article may produce rod-like precipitates having a length of from about 2 nm to about 20 nm and a width, or diameter, of from about 2 nm to about 10 nm. A volume fraction of the crystalline phase in the article may range from about 0.001% to about 20%, or from about 0.001% to about 15%, or from about 0.001% to about 10% or from about 0.001% to about 5%, or from about 0.001% to about 1%.

The relatively small size of the precipitates may be advantageous in reducing the amount of light scattered by the precipitates leading to high optical clarity of the article when in the glass-ceramic state. As will be explained in greater detail below, the size and/or quantity of the precipitates may be varied across the article such that different portions of the article may have different optical properties. For example, portions of the article where the precipitates are present may lead to changes in the absorbance, color, reflectance and/or transmission of light, as well as the refractive index as compared to portions of the article where different precipitates (e.g., size and/or quantity) and/or no precipitates are present. In selected examples of "opaque" regions, the relatively small size of the precipitates provides opacity as a function of absorbance, not by scattering of light due to coarse particles.

The precipitates may be composed of tungsten oxide and/or molybdenum oxide. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation. Without being bound by theory, it is believed that during thermal processing (e.g., heat treating) of the article, tungsten and/or molybdenum cations agglomerate to form crystalline precipitates thereby transforming the glass state into the glass-ceramic state. The molybdenum and/or tungsten present in the precipitates may be reduced, or partially reduced. For example, the molybdenum and/or tungsten within the precipitates may have an oxidation state of between 0 and about +6. According to various examples, the molybdenum and/or tungsten may have a +6 oxidation state. For example, the precipitates may have the general chemical structure of $WO_3$ and/or $MoO_3$. However, there can also be a significant fraction of tungsten and or molybdenum in the +5 oxidation state and the precipitates may be known as non-stoichiometric tungsten suboxides, non-stoichiometric molybdenum suboxides, "molybdenum bronzes" and/or "tungsten bronzes." One or more of the above-noted alkali metals and/or dopants may be present within the precipitates to compensate the +5 charge on the W or Mo. Tungsten and/or molydbenum bronzes are a group of non-stoichiometric tungsten and/or molybdenum sub-oxides that takes the general chemical form of $M_xWO_3$ or $M_xMoO_3$, where M=H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and where $0<x<1$. The structures $M_xWO_3$ and $M_xMoO_3$ are considered to be a solid state defect structure in which holes in a reduced $WO_3$ or $MoO_3$ network are randomly occupied by M atoms, which are dissociated into M+ cations and free electrons. Depending on the concentration of "M," the material properties can range from metallic to semi-conducting, thereby allowing a variety of optical absorption and electronic properties to be tuned. The more 5+W or Mo, the more M+ cations may be need to compensate and the greater the value of x.

A portion, a majority, substantially all or all of the article may be thermally processed to form the precipitates. Thermal processing techniques may include, but are not limited to, a furnace (e.g., a heat treating furnace), a microwave, a laser and/or other techniques of locally and/or bulk heating of the article. While undergoing thermal processing, the crystalline precipitates internally nucleate within the article in a homogenous manner where the article is thermally processed to transform the glass state into the glass-ceramic state. As such, in some examples, the article may include both the glass state and the glass-ceramic state. In examples where the article is thermally processed in bulk (e.g., the whole article is placed in a furnace), the precipitates may homogenously form throughout the article. In other words, the precipitates may exist from a surface of the article throughout the bulk of the article (i.e., greater than about 10 μm from the surface). In examples where the article is thermally processed locally (e.g., via a laser), the precipitates may only be present where the thermal processing reaches a sufficient temperature (e.g., at the surface and into the bulk of the article proximate the heat source). It will be understood that the article may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates.

According to various examples, the article may be optically opaque in the visible region of the electromagnetic spectrum (i.e., from about 400 nm to about 700 nm) both where the precipitates are present and where the precipitates are not present (i.e., in portions which are in the glass state or the glass-ceramic state).

As such, according to various examples, the glass-ceramic state of the article absorbs light in the visible region (i.e., from about 400 nm to about 700 nm) based on the presence of the precipitates without the use of additional coatings or films. In some implementations, the glass-ceramic state of the article is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the visible region of the spectrum (e.g., from about 400 nm to about 700 nm). In some examples, the glass-ceramic state absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the visible region of the spectrum.

According to various examples, the glass-ceramic state of the article absorbs light in the ultraviolet ("UV") region (i.e., wavelengths of less than about 400 nm) based on the presence of the precipitates without the use of additional coatings or films. In some implementations, the glass-ceramic state of the article is characterized by a transmittance of less than 10%/mm, less than 9%/mm, less than 8%/mm, less than 7%/mm, less than 6%/mm, less than 5%/mm, less than 4%/mm, less than 3%/mm, less than 2%/mm, and even less than 1%/mm, for light in at least one 50 nm-wide wavelength band of light in the UV region of the spectrum (e.g., about 200 nm to about 400 nm). In some examples, the glass-ceramic state absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or even at least 99%/mm for light in at least one 50 nm-wide wavelength band of light in the UV region of the spectrum.

The glass-ceramic state may have a sharp UV cutoff wavelength from about 320 nm to about 420 nm. For example, the glass-ceramic state may have a sharp UV cutoff at about 320 nm, about 330 nm, about 340 nm, about 350 nm, about 360 nm, about 370 nm, about 380 nm, about 390 nm, about 400 nm, about 410 nm, about 420 nm, about 430 nm or any value therebetween.

The glass-ceramic state may have a sharp visible light cutoff wavelength from about 420 nm to about 700 nm. For example, the glass-ceramic state may have a sharp visible light cutoff at about 420 nm, about 430 nm, about 440 nm, about 450 nm, about 460 nm, about 470 nm, about 480 nm, about 490 nm, about 500 nm, about 510 nm, about 520 nm, about 530 nm or any value therebetween.

In some examples, the glass-ceramic state of the article has a transmittance of greater than about 5%/mm, greater than about 10%/mm, greater than about 15%/mm, greater than about 20%/mm, greater than about 25%/mm, greater than about 30%/mm, greater than about 40%/mm, greater than about 50%/mm, greater than about 60%/mm, greater than about 70%/mm, greater than about 80%/mm, greater than about 90%/mm and greater than all lower limits between these values, all over at least one 50 nm-wide wavelength band of light in the near-infrared region (NIR) of the spectrum (e.g., from about 700 nm to about 2700 nm).

In yet other examples, the glass-ceramic state of the article has a transmittance of less than about 90%/mm, less than about 80%/mm, less than about 70%/mm, less than about 60%/mm, less than about 50%/mm, less than about 40%/mm, less than about 30%/mm, less than about 25%/mm, less than about 20%/mm, less than about 15%/mm, less than about 10%/mm, less than about 5%/mm, less than about 4%/mm, less than about 3%/mm, less than about 2%/mm, less than 1%/mm and even less than 0.1%/mm and less than all upper limits between these values, all over at least one 50 nm-wide wavelength band of light in the NIR region of the spectrum.

In other examples, the glass-ceramic state of the article absorbs or has an absorption of at least 90%/mm, at least 91%/mm, at least 92%/mm, at least 93%/mm, at least 94%/mm, at least 95%/mm, at least 96%/mm, at least 97%/mm, at least 98%/mm, or at least 99%/mm, or even at least 99.9%/mm for light in at least one 50 nm-wide wavelength band of light in the NIR region of the spectrum.

Visible absorbance in a glass or glass ceramic material can result from the formation of specific nanocrystalline tungstates, such as $M_xWO_4$, where M is some dopant, $0<x<2$ when M is a 1+ cation such as an alkali or silver (Ag), or $0<x<1$ when M is a 2+ cation such as Mn, Mg, and Fe. Some of these tungstate phases are not NIR-absorbing and in-turn can produce strong UV and VIS absorbance while maintaining high NIR transmittance. In one example, visible absorption and/or UV absorption in these glasses is produced with the introduction cobalt as a dopant. Other dopants that are not NIR-absorbing and in-turn can produce strong UV and VIS absorbance while maintaining high NIR transmittance include, but are not limited to any combination of Co, Ni, Cu, Se, Bi, Cr, V, Fe, and Mn. These dopants may remain within either the glassy phase or crystalline phase of the glass ceramic, or both the glassy and crystalline phase FIG. 1A shows a graph 100 of absorbance data for a device that includes a substrate according to one example. In the example of FIG. 1A, the substrates 102 and 104 are an Ag and W-containing glass ceramic. Substrate 102 was heat treated at 525° C. for 90 minutes and then cooled to 450° C. at 1° C./minute and is IR-blocking (i.e., unbleached). Substrate 104 was heat treated at 625° C. for 90 minutes and rapidly cooled in ambient air and is IR-transparent (i.e., IR transparent). The data from FIGS. 1A and 1B demonstrate that a single composition can provide an absorbance of at least 2.5 OD/mm and 0.5 OD/mm in the UV (280-400 nm) and VIS (400-700 nm) regimes, respectively.

Unbleached region data 102 is shown in the graph along with bleached region data 104. As shown in the graph 100, the bleached region exhibits an optical absorbance of 0.5 or less over at least a 50 nm wide wavelength window in the IR spectra from 700 to 2700 nm. In one example, the bleached region exhibits an optical absorbance of 0.3 or less over at least a 50 nm wide wavelength window in the IR spectra from 700 to 2700 nm. In one example, the bleached region exhibits an optical absorbance of 0.1 or less over at least a 50 nm wide wavelength window in the IR spectra from 700 to 2700 nm. In one example, the bleached region exhibits an optical absorbance of 0.1 or less over a majority of the infrared wavelength spectra from about 700 nm to about 2700 nm.

Figure 1B:
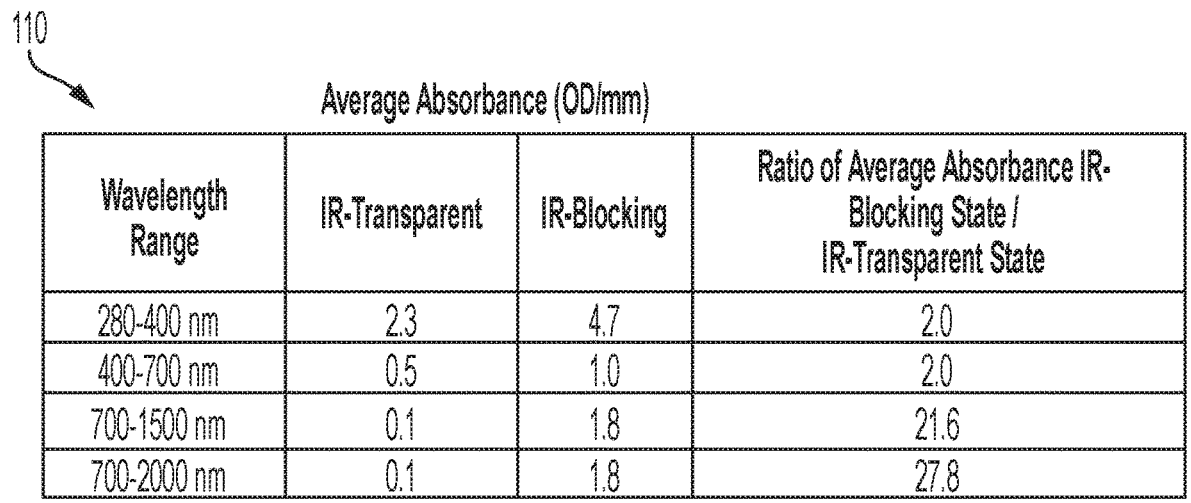
FIG. 1B shows a table of average absorbance data of the material from FIG. 1A in accordance with some example embodiments.

FIG. 1B shows a table 110 including average absorbance values of the device substrate graphed in FIG. 1A. Table 110 shows an average absorption value of the bleached region (IR-Transparent) in the IR wavelength range of 700-2000 nm of 0.1. Table 110 further shows an average absorption value of the unbleached region (IR-Blocking) in the IR wavelength range of 700-2000 nm of 1.8.

Figure 2A:
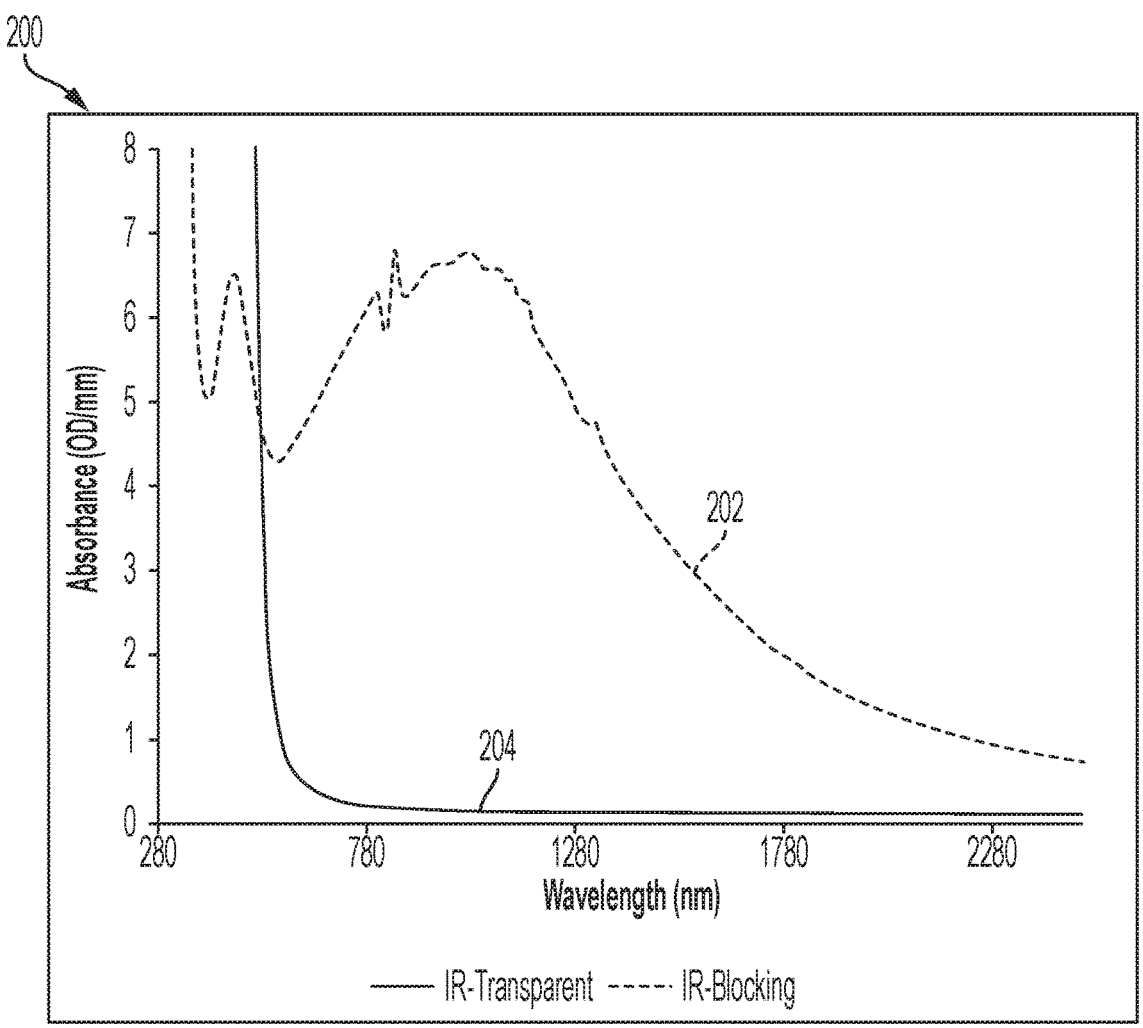
FIG. 2A shows absorbance spectra of another silver doped material in accordance with some example embodiments.

FIG. 2A shows a graph 200 of absorbance data for a device that includes a substrate according to one example. In the example of FIG. 2A, the substrates 202 and 204 are an Ag- and W-containing GC (RTS glass code 196JGN). More specific chemistry of 196JGN is included in Table 1 below. Substrate 202 was heat treated at 525° C. and cooled to 450° C. at 1° C./m and is IR-blocking (i.e., un-bleached). The substrate 204 was heat treated at 650° C. for 1 hour and cooled in ambient air and is IR-Transparent (i.e., bleached). The data from FIGS. 2A and 2B demonstrate that a single composition can provide a high ratio of average absorbance in its near infrared wavelength range as a function of heat treatment.

Unbleached region data 202 is shown in the graph along with bleached region data 204. As shown in the graph 200, the bleached region exhibits an optical absorbance of 0.5 OD/mm or less over at least a 50 nm wide wavelength window in the IR spectra from 700 to 2700 nm. In one example, the bleached region exhibits an optical absorbance of 0.3 or less over at least a 50 nm wide wavelength window in the IR spectra from 700 to 2700 nm. In one example, the bleached region exhibits an optical absorbance of 0.1 OD/mm or less over at least a 50 nm wide wavelength window in the IR spectra from 700 to 2700 nm. In one example, the bleached region exhibits an optical absorbance of 0.1 OD/mm or less over a majority of the infrared wavelength spectra from about 700 nm to about 2700 nm.

Figure 2B:
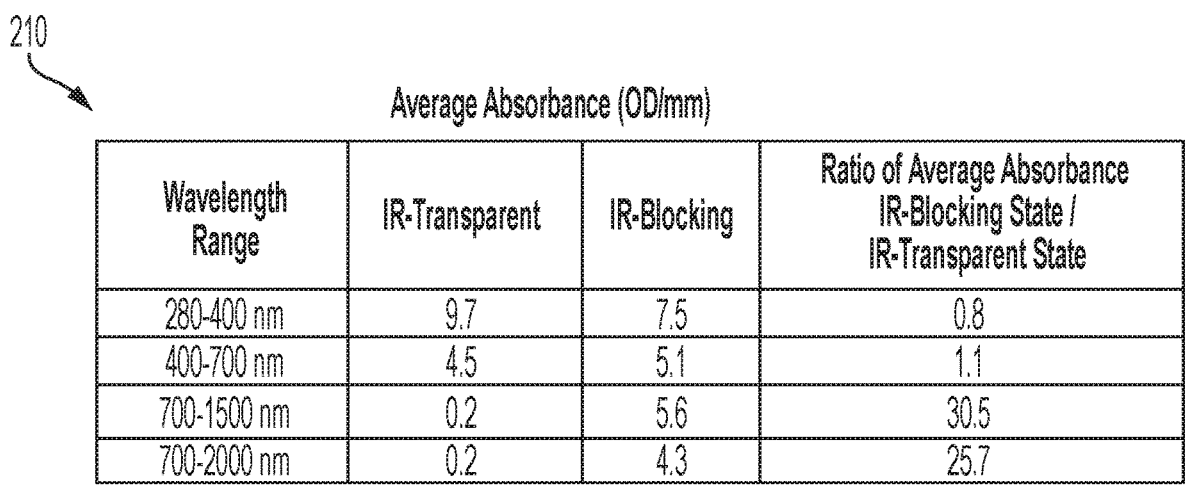
FIG. 2B shows a table of average absorbance data of the material from FIG. 2A in accordance with some example embodiments.

FIG. 2B shows a table 210 including average absorbance values of the device substrate graphed in FIG. 2A. Table 210 shows an average absorption value of the bleached region (IR-Transparent) in the IR wavelength range of 700-2000 nm of 0.2 OD/mm. Table 210 further shows an average absorption value of the unbleached region (IR-Blocking) in the IR wavelength range of 700-2000 nm of 4.3 OD/mm.

Figure 3A:
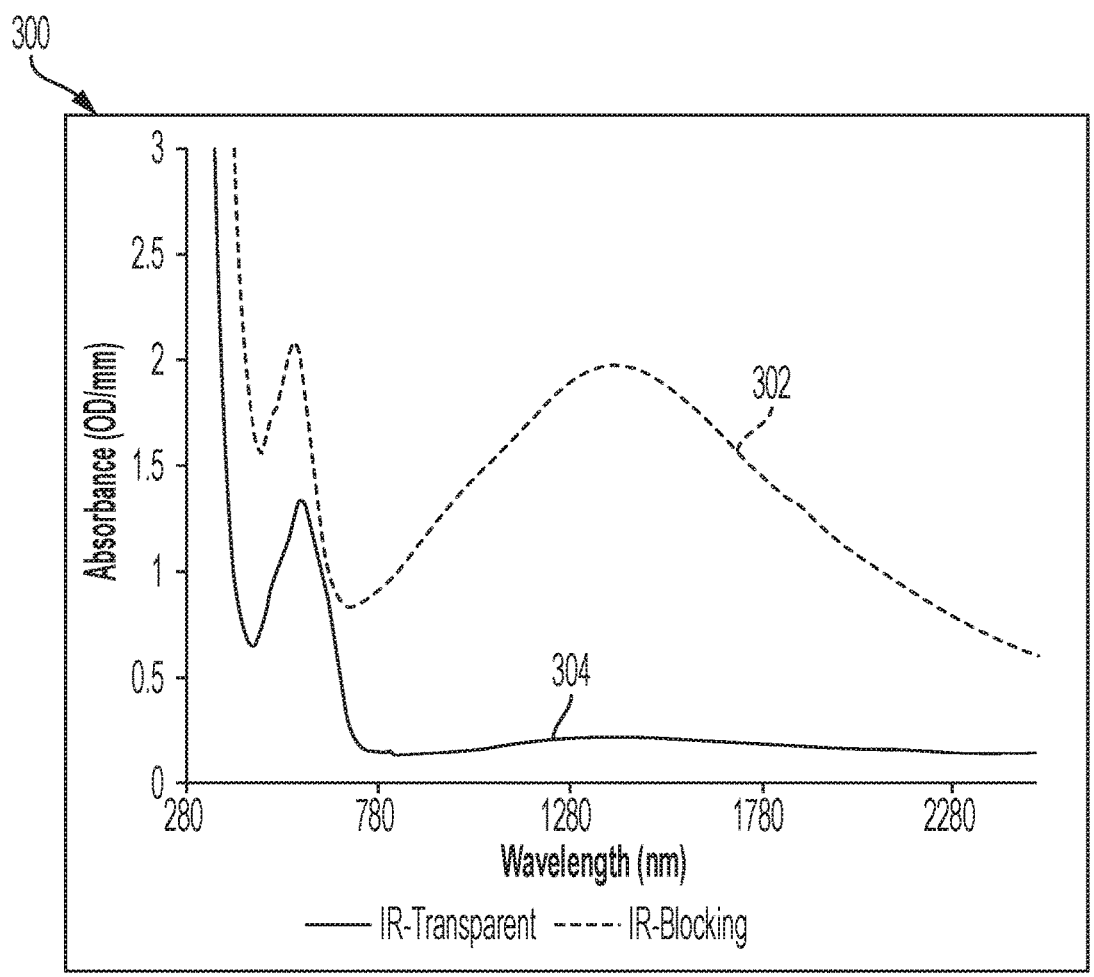
FIG. 3A shows absorbance spectra of a cobalt doped material in accordance with some example embodiments.

FIG. 3A shows a graph 300 of absorbance data for a device that includes a substrate according to one example. In the example of FIG. 3A, the substrates 302 and 304 are an Ag-, W-, and Mo-containing GC (RTS glass code 196JHH) that have low transmittance in the UV and VIS regimes can exhibit either low or high NIR transmittance. The sample 304 that was heat treated at 650° C. for 1 hour and cooled in ambient air is IR-Transparent (i.e. bleached) and the sample 302 heat treated at 525° C. for 2 h and then cooled to 450° C. at 1° C./min is IR-blocking (i.e. unbleached)). More specific chemistry of 196JHH is included in Table 1 below. The data from FIGS. 3A and 3B demonstrate that a single composition at a thickness of about 1 mm can provide <10% average visible transmittance and a high ratio of average absorbance in its near infrared wavelength range as a function of heat treatment.

Unbleached region data 302 is shown in the graph along with bleached region data 304. As shown in the graph 300, the bleached region exhibits an optical absorbance of 0.5 OD/mm or less over at least a 50 nm wide wavelength window in the IR spectra from 700 to 2700 nm. In one example, the bleached region exhibits an optical absorbance of 0.3 OD/mm or less over at least a 50 nm wide wavelength window in the IR spectra from 700 to 2700 nm. In one example, the bleached region exhibits an optical absorbance of 0.1 OD/mm or less over at least a 50 nm wide wavelength window in the IR spectra from 700 to 2700 nm. In one example, the bleached region exhibits an optical absorbance of 0.1 OD/mm or less over a majority of the infrared wavelength spectra from about 700 nm to about 2700 nm.

Figure 3B:
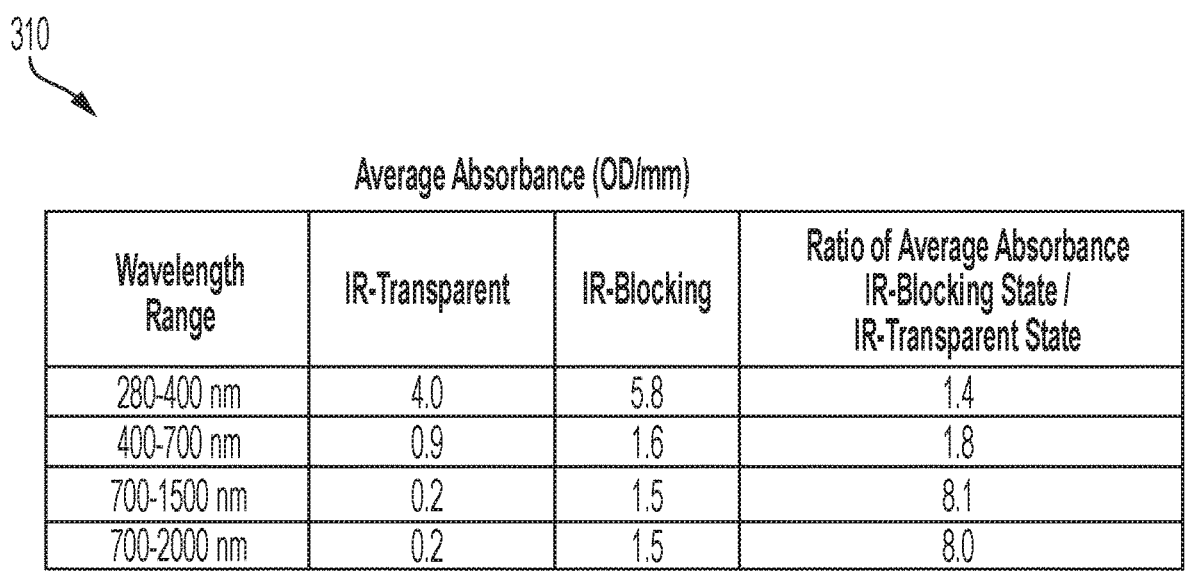
FIG. 3B shows a table of average absorbance data of the material from FIG. 2A in accordance with some example embodiments.

FIG. 3B shows a table 310 including average absorbance values of the device substrate graphed in FIG. 3A. Table 310 shows an average absorption value of the bleached region (IR-Transparent) in the IR wavelength range of 700-2000 nm of 0.2 OD/mm. Table 310 further shows an average absorption value of the unbleached region (IR-Blocking) in the IR wavelength range of 700-2000 nm of 1.5 OD/mm.

Figure 4:
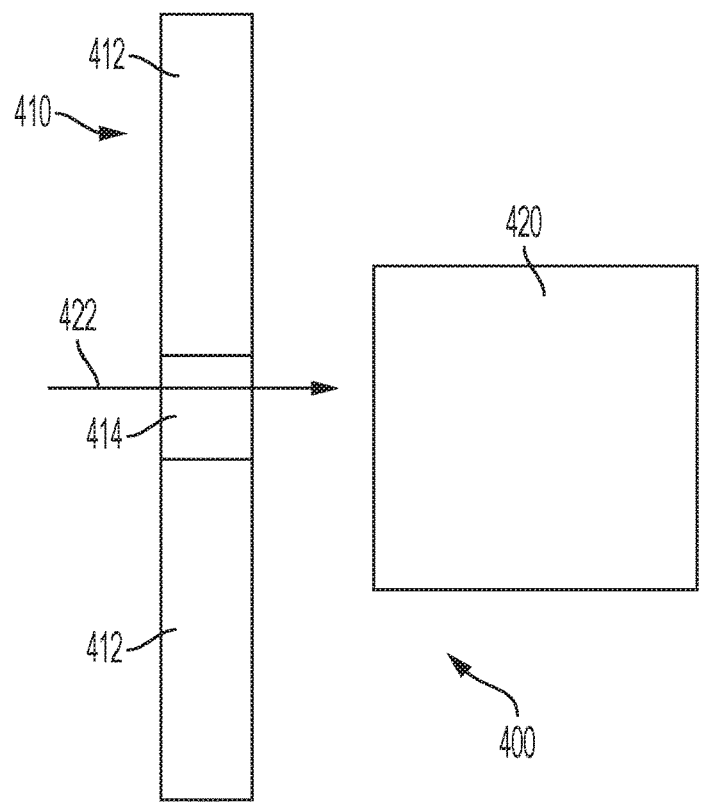
FIG. 4 shows a device or apparatus in accordance with some example embodiments.

FIG. 4 illustrates one example of an apparatus 400. The apparatus 400 includes an optical device 420 located behind a panel 410 of glass or glass-ceramic substrate as described in examples above. FIG. 4 illustrates an unbleached region 412, and a bleached discrete region 414. The bleached region 414 allows for transmission of a selected wavelength of light 422. In one example, the unbleached region 412 includes an optical absorbance of 2.0 OD/mm or greater over a broad range of wavelengths. In one example, the unbleached region 412 includes an optical absorbance of 2.0 OD/mm or greater over the visible wavelength range and the IR range. In one example, the unbleached region 412 includes an optical absorbance of 2.0 OD/mm or greater over the visible wavelength range and the UV range, and the IR range.

In one example, the bleached region 414 includes an optical absorbance of 0.5 OD/mm or less over at least a 50 nm wide wavelength window in the infrared wavelength range of 700 nm to 2700 nm. In one example, the bleached region 414 includes an optical absorbance of 0.5 OD/mm or less over a majority of the IR spectra from 700 to 2700 nm.

As shown in FIG. 4, the bleached region 414 of the panel is located adjacent to the optical device. Such a configuration can be useful in several applications. In one example, the optical device 420 includes a near infrared (NIR) optical detector. In such a device, the bleached region 414 can allow detection of IR light transmissions being sent from a source, and the specific geometry of the bleached region 414 can be used to select only IR light transmissions from a desired direction. The other unbleached region 412 of the panel 410 will block unwanted noise from other sources. One such device may include a smart watch heart rate detector or blood oxygen detector. Additionally, because the material is substantially opaque in the visible regime whether it is transparent or opaque in the NIR, it hides the optical device 420 from view.

In one example, the bleached region 414 and unbleached region 412 are formed from the same material, and a subsequent treatment modifies (bleaches) a selected portion of the material to form the bleached region 414, leaving the unselected portions as unbleached regions 412. One example of a treatment includes localized laser heating. Other examples include, but are not limited to, flame treatment, heat lamps, electric ovens, etc. In one example, the bleached region 414 is only bleached in the NIR wavelength range. In one example, the rest of the material, bleached or unbleached, remains substantially opaque in other wavelengths, such as visible wavelengths and UV wavelengths.

In one example, the optical device 420 includes a near infrared (NIR) light source. In such a device, the bleached region 414 can transmit NIR wavelengths, and the specific geometry of the bleached region 414 can be used to block other unwanted directions of NIR light transmitting from the optical device 420. One such device may include a smart watch heart rate detector or blood oxygen detector integrated behind a single panel, where one bleached region is located in front of a transmitter, and one bleached region is located in front of a detector.

In one example, the optical device 420 includes a near infrared (NIR) camera. In such a device, the bleached region 414 can allow detection of IR light transmissions being sent from or reflected from a source, and the specific geometry of the bleached region 414 can be used to select only IR light transmissions from a desired direction. The other unbleached region 412 of the panel 410 will block unwanted light from other sources. Additionally, the panel 410 may be used to conceal the camera, for example, as a deadfront camera.

In selected examples, because the bleached region 414 transmits IR light, an IR camera will operate as designed, when located in front of the bleached region 414. In selected examples, because both the bleached region 414 and the unbleached region 412 of the panel 410 are substantially opaque in the visible light spectra, the bleached region 414 will blend in completely when viewed in visible light. Only an IR imager may detect the presence of the bleached region 414, as it will appear transparent under IR light, while the unbleached region 412 will appear opaque under IR light. Because most concealed camera settings involve being viewed under the visible spectra (and with human eyes), a deadfront camera using panels as described above will be particularly effective at concealment to the unaided eye (i.e somebody looking at the device). Additionally, because the optical absorbance of the glass ceramic panel 410 is constant throughout its entire thickness, the absorbance of the panel will not be as affected by scratches, as the thin coatings often employed for deadfront cameras would. Further, a glass or glass ceramic material as described above, will be more durable compared to a polymer panel and/or most coatings. Additionally, these glass ceramics are substantially transparent at radio and wireless communication frequencies unlike certain coatings that attenuate them.

Although a camera is used as an example, any number of optical devices and apparatuses will benefit from substrates and panels as described. Other example devices using a bleached region and an unbleached region include, but are not limited to, autonomous vehicle navigation systems, various home automation products, iris scanners, augmented reality systems, machine vision systems, etc.

Figure 5:
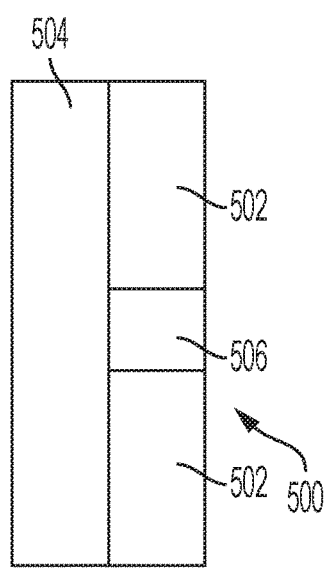
FIG. 5 shows a device or apparatus in accordance with some example embodiments.

FIG. 5, illustrates an example panel 500 that is substantially opaque in the UV and NIR that includes a substrate 502 and a clad layer 504. In one example, the clad layer 504 includes a different coefficient of thermal expansion (CTE) from the substrate 502. In one example, the difference in CTE provides a stress gradient that prevents crack growth, and maintains a compressive stress in a desired layer 502, 504 at the interface between the layers 502, 504. In the example of FIG. 5, a bleached region 506 is located within substrate 502 similar to examples described above, and the substrate is protected by the clad layer 504. Although a CTE mismatch is described, in other examples, the clad layer 504 is CTE matched with the substrate 502, and the clad layer 504 provides a physical barrier to the substrate 502.

Figure 6:
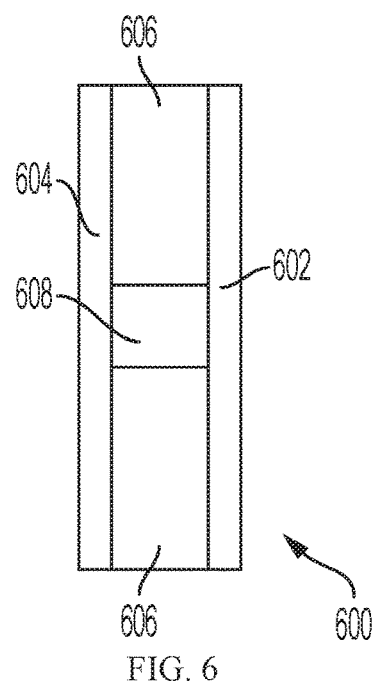
FIG. 6 shows another device or apparatus in accordance with some example embodiments.

FIG. 6 illustrates a further example of a core clad laminate that is substantially opaque in the UV and VIS, but having tunable NIR transmittance. In the example of FIG. 6, a panel 600 is shown, including a substrate (or core) 606 includes a bleached region 608 as described in examples above. A first clad layer 602 and a second clad layer 604 are shown located over opposing major surfaces of the substrate 606. Similar to the example of FIG. 5, the clad layers 602, 604 may provide a different coefficient of thermal expansion (CTE) from the substrate 606. This property may provide a protective stress at interfaces. In the case of the three-layer systems as shown in FIG. 6, the core and clad can be either CTE matched or mismatched, and in the case of a CTE mismatch, because it is a symmetric structure, the laminate does not warp.

Although the term "interface" is used to describe the region between substrates and clad layers, the term may not imply a discrete interface. In selected examples, the clad layers may be fused and may include a gradient of composition and properties between the substrate and the clad layer or layers.

In some implementations, the panel (500, 600) is formed with compressive stresses from both a mechanical strengthening process (e.g., via CTE mismatch of the core and clad glass layers) and a chemical strengthening process (e.g., via an ion-exchange process), resulting in a deep compressive stress region. The resulting panel (500, 600) has a higher combined compressive stress (CS) and/or depth of compressive stress layer (DOL) than the CS and/or DOL levels that can be achieved using either mechanical or chemical strengthening processes alone. In some examples, the panel (500, 600) is subjected to mechanical strengthening through CTE mismatch of the substrate and clad layer such that one or more layers has compressive stress (CS) at its outer surfaces of over 50 MPa, over 250 MPa, in a range from about 50 MPa to about 400 MPa, from about 50 MPa to about 300 MPa, from about 250 MPa to about 600 MPa, or from about 100 MPa to about 300 MPa. Further, in some embodiments, the panel (500, 600) is subjected to a chemical strengthening from an ion exchange process such that one or more layers has a compressive stress region with a CS of 200 MPa or greater, 300 MPa or greater, 400 MPa or greater, 500 MPa or greater, 600 MPa or greater, 700 MPa or greater, 800 MPa or greater, 900 MPa or greater, a range from 200 MPa to about 1000 MPa, or from about 200 MPa to about 800 MPa. In examples of the panel 500 subjected to both mechanical and chemical strengthening, one or more of the layers can have a compressive stress (CS) at its outer surfaces as high as 700 MPa to 1000 MPa (e.g., about 300 MPa from mechanical strengthening and about 700 MPa from chemical strengthening).

FIG. 7 shows an apparatus 700 including a panel 702 that is substantially opaque in the UV and VIS wavelength regimes that includes a plurality of bleached discrete regions 706 that transmit NIR wavelengths and a plurality of unbleached regions 704 that are opaque to NIR wavelengths. In the example of FIG. 7, each bleached discrete region 706 is oriented at an angle with respect to a direction normal to a major surface of the panel 702. As shown, this allows additional selectivity of incident, or exiting NIR wavelengths.

FIG. 7 illustrates how incident beam 708 is allowed to pass through the bleached region 706 because an angle of the incident light substantially matches the angle of the bleached region 706. Incident beam 710 does not substantially align with an angle of the bleached region 706, therefore incident beam 710 does not pass through the panel 702 to reach the optical device 712 located behind the panel 702. Example panel 702 may be used with any of the example devices or apparatuses described in the present disclosure to provide additional selectivity of incident light as needed for any particular optical application. In the example of FIG. 7, only NIR wavelengths at the appropriate angle can transmit through this device. UV and VIS wavelengths do not pass through panel 702, irrespective of the angle of incidence.

FIG. 8A shows another apparatus 820 that is substantially opaque at UV and NIR wavelengths, including a panel 822 that includes a substrate 821. The substrate 821 includes a plurality of bleached discrete regions 826 that transmit NIR wavelengths and a plurality of unbleached regions 824 that do not transmit NIR wavelengths. In the example of FIG. 8A, each bleached discrete region 826 is oriented at an angle with respect to a direction normal to a major surface of the panel 822. Similar to the example of FIG. 7, this allows additional angular selectivity of incident, or exiting NIR wavelengths.

The panel 822 in FIG. 8A further includes the addition of a first clad layer 834 and a second clad layer 836. In the example shown, the clad layers 834, 836 are shown located over opposing major surfaces of the substrate 822. Similar to the examples of FIGS. 5 and 6, the clad layers 834, 836 may provide a different coefficient of thermal expansion (CTE) from the substrate 821. This property may provide a protective stress at interfaces.

FIG. 8A illustrates how incident beam 828 of NIR wavelengths is allowed to pass through the bleached region 826 because an angle of the incident light substantially matches the angle of the bleached region 826. Incident beam 830 does not substantially align with an angle of the bleached region 826, therefore incident beam 830 does not pass through the panel 822 to reach the optical device 832 located behind the panel 822. Example panel 822 may be used with any of the example devices or apparatuses described in the present disclosure to provide additional angular selectivity of incident light as needed for any particular optical application.

FIG. 8B shows another apparatus 840 that is substantially opaque in the UV and visible light regimes, but having selectively tunable NIR transmittance. This apparatus 840 includes a panel 841 that includes multiple components. The panel 841 includes a core 870 a first clad 842 and a second clad 852. The first clad 842 includes a plurality of bleached discrete regions 846 that transmit NIR wavelengths and a plurality of unbleached regions 844 that do not transmit NIR wavelengths. In the example of FIG. 8B, each bleached discrete region 846 is oriented at an angle with respect to a direction normal to a major surface of the clad 842. Similar to examples described above, this allows additional selectivity of incident light, or exiting light. The second clad 852 also includes a plurality of bleached discrete regions 856 and a plurality of unbleached regions 854. Each bleached discrete region 856 is oriented at an angle with respect to a direction normal to a major surface of the clad 852. Similar to examples described above, this allows additional selectivity of incident light, or exiting light.

In one example, the core 870 includes a different coefficient of thermal expansion (CTE) from the substrates 842, 852. This property may provide increased strengthening of the panel 841. In selected examples, the core 870 provides a spacing between substrates 842, 852 that provides increased angular selectivity when implemented as described below.

FIG. 8B illustrates how incident beam 864 is allowed to pass through the bleached region 856 of clad 852 and further through bleached region 846 of clad 842. The addition of two clad layers 842, 853, spaced apart by core 870, provides additional selectivity to incident light. In one example bleached regions 856 are offset horizontally from bleached regions 846 to provide the additional selectivity. In one example, the bleached regions 856 are formed at a different angle compared to bleached regions 846 to provide the additional selectivity. In one example both offset and different angles between bleached regions 856, 846 provides additional angular selectivity of NIR wavelengths being transmitted or received by apparatus 840.

As an illustration, incident light 862 passes through bleached regions 856, but is stopped at clad 842 by unbleached regions 844. Incident light 860 is shown not passing through either clad layer 852 or 842 as a result of the different angles in incident light 860 from the bleached regions 856. Only incident light 862 is shown passing both clad layers 852, 842 and reaching optical device 872.

EXAMPLES

Table 1 shows three example chemistries of materials that may be used in one or more of the devices and apparatuses described above.

TABLE 1

| Mole Percent (mol %) | 196JMV | 196JGN | 196JHH |
| --- | --- | --- | --- |
| SiO2 | 63.0507 | 66.9874 | 66.8590 |
| Al2O3 | 10.5340 | 9.5895 | 9.5711 |
| B2O3 | 11.3768 | 9.3979 | 9.3798 |
| Li2O | 5.3075 | 4.8315 | 4.8224 |
| Na2O | 6.0005 | 4.9825 | 4.9731 |
| K2O | 0.0226 | 0.0206 | 0.0205 |
| CaO | 0.0210 | 0.0191 | 0.0191 |
| SnO2 | 0.1053 | 0.0480 | 0.0478 |
| WO3 | 3.4763 | 3.6441 | 1.9143 |
| MoO3 | 0.0000 | 0.0000 | 1.9142 |
| Ag | 0.1053 | 0.4795 | 0.4786 |
| Total | 100 | 100 | 100 |

Table 2 shows ten additional example chemistries of materials that may be used in one or more of the devices and apparatuses described above.

TABLE 2

| Mole percent (mol %) | 196JXU | 196JXV | 196JXW | 196JXX | 196JXY | 196JXZ | 196JYA | 196JYB | 196JYS | 196JYT |
| --- | --- | --- | --- | --- | --- | --- | --- | --- | --- | --- |
| SiO2 | 67.124 | 67.025 | 66.902 | 67.062 | 66.901 | 66.582 | 66.864 | 66.704 | 67.420 | 67.388 |
| Al2O3 | 9.609 | 9.595 | 9.577 | 9.600 | 9.577 | 9.531 | 9.572 | 9.549 | 9.651 | 9.647 |
| B2O3 | 9.417 | 9.403 | 9.386 | 9.408 | 9.386 | 9.341 | 9.381 | 9.358 | 9.458 | 9.454 |
| Li2O | 4.882 | 4.834 | 4.825 | 4.837 | 4.825 | 4.802 | 4.823 | 4.811 | 4.863 | 4.861 |
| Na2O | 4.953 | 4.985 | 4.976 | 4.988 | 4.976 | 4.952 | 4.973 | 4.962 | 5.015 | 5.012 |
| K2O | 0.021 | 0.021 | 0.020 | 0.021 | 0.021 | 0.020 | 0.020 | 0.020 | 0.021 | 0.021 |
| MgO | 0.021 | 0.021 | 0.021 | 0.021 | 0.021 | 0.021 | 0.021 | 0.021 | 0.017 | 0.017 |
| CaO | 0.019 | 0.019 | 0.019 | 0.019 | 0.019 | 0.019 | 0.019 | 0.019 | 0.002 | 0.002 |
| SnO2 | 0.048 | 0.048 | 0.048 | 0.048 | 0.048 | 0.048 | 0.048 | 0.048 | 0.048 | 0.048 |
| WO3 | 3.746 | 3.742 | 3.735 | 3.744 | 3.735 | 3.717 | 3.733 | 3.724 | 3.282 | 3.280 |
| Fe2O3 | 0.004 | 0.004 | 0.004 | 0.004 | 0.005 | 0.006 | 0.004 | 0.005 | 0.003 | 0.003 |
| Cl— | 0.001 | 0.001 | 0.001 | 0.001 | 0.001 | 0.001 | 0.001 | 0.001 | 0.001 | 0.001 |
| TiO2 | 0.007 | 0.007 | 0.007 | 0.007 | 0.007 | 0.007 | 0.007 | 0.007 | 0.006 | 0.006 |
| Co3O4 | 0.148 | 0.296 | 0.479 | 0.000 | 0.000 | 0.000 | 0.295 | 0.294 | 0.164 | 0.164 |
| Cr2O3 | 0.000 | 0.000 | 0.000 | 0.000 | 0.000 | 0.000 | 0.000 | 0.000 | 0.048 | 0.096 |
| NiO | 0.000 | 0.000 | 0.000 | 0.240 | 0.479 | 0.953 | 0.239 | 0.478 | 0.000 | 0.000 |
| Total | 100 | 100 | 100 | 100 | 100 | 100 | 100 | 100 | 100 | 100 |

To better illustrate the devices and apparatuses disclosed herein, a non-limiting list of embodiments is provided here:

Example 1 includes a device that includes a substrate, the substrate comprising a glass or glass-ceramic material comprising from about 0.1% to about 50% by weight crystalline phase. The substrate includes an unbleached region and a bleached discrete region comprising at least partially dissolved or altered crystalline phase wherein an average ratio of absorbance in the unbleached/bleached regions over the near infra-red (NIR) wavelength range of 700-2000 nm is equal to or greater than 7.5, wherein the substrate is substantially opaque in the visible wavelength range of 400 nm to 700 nm.

Example 2 includes the device of example 1, wherein the substrate includes a modifiable crystalline phase consisting of an oxide or sub-oxide comprising tungsten and or molybdenum that may be doped with any combination of: Li, Na, K, Rb, Cs, Be, Mg, Ca, Sr, Ba, Ra, Ti, Zn, Se, Nb, Ru, Rh, In, Sn, Pb, Ce, Pr, Nd, Pm, Sm, Eu, Gd, Tb, Dy, Ho, Er, Tm, Yb, and Lu, wherein this modifiable component amount is from about 0.35 mol % to about 30 mol %.

Example 3 includes the device of any one of examples 1-2, wherein the substrate includes a dopant, wherein the dopant includes an element chosen from a group consisting of Co, Ni, Cu, Se, Bi, Cr, V, Fe, and Mn.

Example 4 includes the device of any one of examples 1-3, wherein the dopant includes Ag.

Example 5 includes the device of any one of examples 1-4, wherein the dopant includes Co.

Example 6 includes the device of any one of examples 1-5, wherein the substrate is substantially opaque in the ultraviolet A wavelength range of 315 nm to 400 nm.

Example 7 includes the device of any one of examples 1-6, wherein the substrate is substantially opaque in the ultraviolet B wavelength range of 280 nm to 315 nm.

Example 8 includes the device of any one of examples 1-7, wherein the substrate is substantially opaque in the ultraviolet C wavelength range of 100 nm to 280 nm.

Example 9 includes the device of any one of examples 1-8, further including one or more clad layers on a surface of the substrate, wherein the one or more clad layers includes a different coefficient of thermal expansion (CTE) from the substrate.

Example 10 includes the device of any one of examples 1-9, wherein the one or more clad layers includes clad layers over opposing major surfaces of the substrate.

Example 11 includes an apparatus, including an optical device located behind a panel of glass or glass-ceramic, wherein the glass-ceramic includes from about 0.1% to about 50% by weight crystalline phase, wherein the panel comprises an unbleached region having an average optical absorbance of 1.0 OD/mm or greater over the near infrared (NIR) wavelength range of 700 nm to 2000 nm and a bleached discrete region comprising at least partially dissolved or altered crystalline phase, the bleached discrete region having an average optical absorbance of 0.5 OD/mm or less over the near infrared (NIR) wavelength range of 700 nm to 2000 nm, wherein the panel is substantially opaque in the visible wavelength range of 400 nm to 700 nm, and wherein the bleached discrete region of the panel is located adjacent to the optical device.

Example 12 includes the apparatus of example 11, wherein the optical device includes a near infrared (NIR) optical detector.

Example 13 includes the apparatus of any one of examples 11-12, wherein the optical device includes a near infrared (NIR) light source.

Example 14 includes the apparatus of any one of examples 11-13, wherein the optical device includes a near infrared (NIR) camera.

Example 15 includes the apparatus of any one of examples 11-14, wherein the bleached discrete region includes a plurality of bleached discrete regions, each region oriented at an angle with respect to a direction normal to a major surface of the panel.

Example 16 includes the apparatus of any one of examples 11-15, wherein the panel include a plurality of layers, wherein two or more layer each include a plurality of bleached discrete regions, each region oriented at an angle with respect to a direction normal to a major surface of the panel.

Example 17 includes the apparatus of any one of examples 11-16, wherein the plurality of layers includes one or more layers having a different coefficient of thermal expansion (CTE) from an adjacent layer of the plurality of layers.

Example 18 includes the apparatus of any one of examples 11-17, wherein the panel includes a curved major surface.

Example 19 includes the apparatus of any one of examples 11-18, wherein the panel includes one or more clad layers on a surface of the panel, wherein the one or more clad layers includes a different coefficient of thermal expansion (CTE) from an adjacent region of the panel.

Example 20 includes the apparatus of any one of examples 11-19, wherein the one or more clad layers includes clad layers over opposing major surfaces of the panel.

Example 21 includes a concealed near infrared (NIR) optical device. The optical device includes an NIR camera located behind a panel of glass or glass-ceramic, wherein the glass-ceramic includes from about 0.1% to about 50% by weight crystalline phase. The panel includes an unbleached region having an average optical absorbance of 1.0 OD/mm or greater over the near infrared (NIR) wavelength range of 700 nm to 2000 nm and a bleached discrete region comprising at least partially dissolved or altered crystalline phase, the bleached discrete region having an average optical absorbance of 0.5 OD/mm or less over the near infrared (NIR) wavelength range of 700 nm to 2000 nm, wherein the panel is substantially opaque in the UV and visible wavelength range of 100 nm to 700 nm, and wherein the bleached discrete region of the panel is located adjacent to a lens of the NIR camera.

Example 22 includes the concealed near infrared (NIR) optical device of example 21, wherein the substrate includes a modifiable crystalline phase consisting of an oxide or sub-oxide comprising tungsten and or molybdenum that may be doped with any combination of: Li, Na, K, Rb, Cs, Be, Mg, Ca, Sr, Ba, Ra, Ti, Zn, Se, Nb, Ru, Rh, In, Sn, Pb, Ce, Pr, Nd, Pm, Sm, Eu, Gd, Tb, Dy, Ho, Er, Tm, Yb, and Lu, wherein this modifiable component amount is from about 0.35 mol % to about 30 mol %.

Example 23 includes the concealed near infrared (NIR) optical device of any one of examples 21-22, wherein the substrate includes a dopant, wherein the dopant includes an element chosen from a group consisting of Co, Ni, Cu, Se, Bi, Cr, V, Fe, and Mn.

Example 24 includes the concealed near infrared (NIR) optical device of any one of examples 21-23, wherein the substrate includes a dopant that includes Ag.

Example 25 includes the concealed near infrared (NIR) optical device of any one of examples 21-24, wherein the substrate includes a dopant that includes Co.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof

What is claimed is:

1. A device comprising:
a substrate comprising a glass or glass-ceramic material comprising about 0.1% to about 50% by weight crystalline phase;
the substrate comprising an unbleached region and a bleached discrete region comprising at least partially dissolved or altered crystalline phase wherein an average ratio of absorbance in the unbleached/bleached regions over the near infra-red (NIR) wavelength range of 700-2000 nm is equal to or greater than 7.5;
wherein the substrate is substantially opaque in the visible wavelength range of 400 nm to 700 nm and the unbleached region exhibits an average absorbance of 1.0 OD/mm or greater in the visible wavelength range of 400 nm to 700 nm; and
wherein the substrate includes a modifiable crystalline phase consisting of an oxide or sub-oxide comprising tungsten and/or molybdenum that may be doped with any combination of: Li, Na, K, Rb, Cs, Be, Mg, Ca, Sr, Ba, Ra, Ti, Zn, Se, Nb, Ru, Rh, In, Sn, Pb, Ce, Pr, Nd, Pm, Sm, Eu, Gd, Tb, Dy, Ho, Er, Tm, Yb, and Lu, wherein this modifiable component amount is about 0.35 mol % to about 30 mol %.

2. The device of claim 1, wherein the substrate includes a dopant, wherein the dopant is selected from a group consisting of Co, Ni, Cu, Se, Bi, Cr, V, Fe, and Mn.

3. The device of claim 2, wherein the dopant is Co.

4. The device of claim 1, wherein the substrate is substantially opaque in the ultraviolet A wavelength range of 315 nm to 400 nm.

5. The device of claim 4, wherein the substrate is substantially opaque in the ultraviolet B wavelength range of 280 nm to 315 nm.

6. The device of claim 5, wherein the substrate is substantially opaque in the ultraviolet C wavelength range of 100 nm to 280 nm.

7. An apparatus, comprising:
an optical device located behind a panel of glass or glass-ceramic, wherein the glass-ceramic includes about 0.1% to about 50% by weight crystalline phase;
the panel comprising an unbleached region having an average optical absorbance of 1.0 OD/mm or greater over the near infrared (NIR) wavelength range of 700 nm to 2000 nm and a bleached discrete region comprising at least partially dissolved or altered crystalline phase, the bleached discrete region having an average optical absorbance of 0.5 OD/mm or less over the near infrared (NIR) wavelength range of 700 nm to 2000 nm; and
wherein the panel is substantially opaque in the visible wavelength range of 400 nm to 700 nm and the unbleached region exhibits an average absorbance of 1.0 OD/mm or greater in the visible wavelength range of 400 nm to 700 nm;
wherein the bleached discrete region of the panel is located adjacent to the optical device;
wherein the panel includes a modifiable crystalline phase consisting of an oxide or sub-oxide comprising tungsten and/or molybdenum that may be doped with any combination of: Li, Na, K, Rb, Cs, Be, Mg, Ca, Sr, Ba, Ra, Ti, Zn, Se, Nb, Ru, Rh, In, Sn, Pb, Ce, Pr, Nd, Pm, Sm, Eu, Gd, Tb, Dy, Ho, Er, Tm, Yb, and Lu, wherein this modifiable component amount is about 0.35 mol % to about 30 mol %.

8. The apparatus of claim 7, wherein the optical device includes a near infrared (NIR) optical detector.

9. The apparatus of claim 7, wherein the optical device includes a near infrared (NIR) light source.

10. The apparatus of claim 9, wherein the optical device includes a near infrared (NIR) camera.

11. The apparatus of claim 7, wherein the bleached discrete region includes a plurality of bleached discrete regions, each region oriented at an angle with respect to a direction normal to a major surface of the panel.

12. The apparatus of claim 7, wherein the panel include a plurality of layers, wherein two or more layer each include a plurality of bleached discrete regions, each region oriented at an angle with respect to a direction normal to a major surface of the panel.

13. The apparatus of claim 12, wherein the plurality of layers includes one or more layers having a different coefficient of thermal expansion (CTE) from an adjacent layer of the plurality of layers.

14. The apparatus of claim 7, wherein the panel includes a curved major surface.

15. A concealed near infrared (NIR) optical device,
an NIR camera located behind a panel of glass or glass-ceramic, wherein the glass-ceramic includes about 0.1% to about 50% by weight crystalline phase;
the panel comprising an unbleached region having an average optical absorbance of 1.0 OD/mm or greater over the near infrared (NIR) wavelength range of 700 nm to 2000 nm and a bleached discrete region comprising at least partially dissolved crystalline phase, the bleached discrete region having an average optical absorbance of 0.5 OD/mm or less over the near infrared (NIR) wavelength range of 700 nm to 2000 nm; and
wherein the panel is substantially opaque in the UV and visible wavelength range of 100 nm to 700 nm and the unbleached region exhibits an average absorbance of 1.0 OD/nm or greater in the visible wavelength range of 400 nm to 700 nm;

wherein the bleached discrete region of the panel is located adjacent to a lens of the NIR camera;

wherein the panel includes a modifiable crystalline phase consisting of an oxide or sub-oxide comprising tungsten and/or molybdenum that may be doped with any combination of: Li, Na, K, Rb, Cs, Be, Mg, Ca, Sr, Ba, Ra, Ti, Zn, Se, Nb, Ru, Rh, In, Sn, Pb, Ce, Pr, Nd, Pm, Sm, Eu, Gd, Tb, Dy, Ho, Er, Tm, Yb, and Lu, wherein this modifiable component amount is about 0.35 mol % to about 30 mol %.

16. The concealed near infrared (NIR) optical device of claim 15, wherein the substrate includes a dopant, wherein the dopant is selected from a group consisting of Co, Ni, Cu, Se, Bi, Cr, V, Fe, and Mn.

17. The concealed near infrared (NIR) optical device of claim 16, wherein the dopant is Co.

* * * * *